US006944395B2

(12) United States Patent
Hara

(10) Patent No.: US 6,944,395 B2
(45) Date of Patent: Sep. 13, 2005

(54) IMAGE SENSING APPARATUS

(75) Inventor: Yoshihiro Hara, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/655,938

(22) Filed: Sep. 5, 2003

(65) Prior Publication Data

US 2004/0240867 A1 Dec. 2, 2004

(30) Foreign Application Priority Data

May 30, 2003 (JP) ........................................ 2003-154833

(51) Int. Cl.⁷ .............................................. G03B 5/00
(52) U.S. Cl. ...................................................... 396/52
(58) Field of Search ................... 396/52–55; 348/208.2, 348/208.99; 359/554–557

(56) References Cited

U.S. PATENT DOCUMENTS 5,367,993 A * 11/1994 Tulach et al. ............ 123/90.38
5,619,030 A * 4/1997 Shiomi .................... 250/201.1
5,861,915 A * 1/1999 Sato et al. ............... 348/208.2
5,890,018 A * 3/1999 Terui ........................ 396/53

FOREIGN PATENT DOCUMENTS

| JP | 11-344344 A | 12/1999 |
| JP | 2001-290183 A | 10/2001 |

* cited by examiner

Primary Examiner—W. B. Perkey
(74) Attorney, Agent, or Firm—Sidley Austin Brown & Wood LLP

(57) ABSTRACT

An image sensing apparatus includes: a yaw sensor for detecting a shake of the image sensing apparatus in a yaw direction, a pitch sensor for detecting a shake of the image sensing apparatus in a pitch direction, the pitch sensor having a detection precision higher than the yaw sensor, and a shake correcting section for correcting a shake of the image sensing apparatus based on an output signal from the yaw sensor and an output signal from the pitch sensor. The shake correction can be performed with higher precision.

13 Claims, 14 Drawing Sheets

VOLTAGE LOOKUP TABLE

FIG.7A
| INC | IN₁ | IN₂ | H₁ | H₂ |
|-----|-----|-----|----|----|
| H | H | H | F | F |
| H | L | H | R | F |
| H | L | L | R | R |
| H | H | L | F | R |
| L | × | × | STOP | |
F : FORWARD
R : REVERSE
H : HIGH
L : LOW
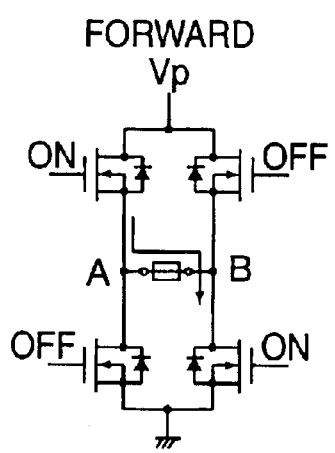
FIG.7B
FORWARD
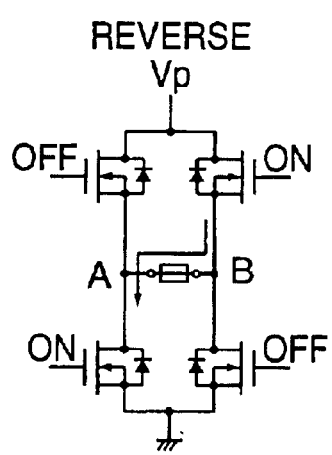
FIG.7C
REVERSE
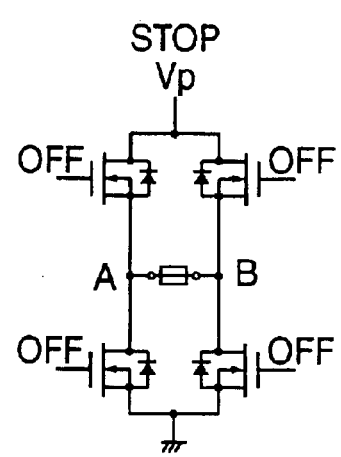
FIG.7D
STOP

| LOT | No. | TEMPERATURE-DEPENDENT SENSITIVITY VARIATION | | | | | |
|---|---|---|---|---|---|---|---|
| | | -5 | 0 | 10 | 25 | 50 | 70 |
| 1A | 1 | -0.6 | 1.2 | 1.9 | 0 | -2.5 | -4.2 |
| | 2 | -0.3 | 1.7 | 2.1 | 0 | -2.4 | -4.6 |
| | 3 | -1.7 | 0.1 | 1.3 | 0 | -2.7 | -3.9 |
| | 4 | -1.5 | 0.1 | 2 | 0 | -2.8 | -5.0 |
| | 5 | 0.2 | 1.5 | 2.2 | 0 | -2.1 | -4.4 |
| | AVE | -0.78 | 0.92 | 1.9 | 0 | -2.5 | -4.42 |
| | MAX | 0.2 | 1.7 | 2.2 | 0 | -2.1 | -3.9 |
| | MIN | -1.7 | 0.1 | 1.3 | 0 | -2.8 | -5.0 |
| | MAX2 | 0.98 | 0.78 | 0.3 | 0 | 0.4 | 0.52 |
| | MIN2 | -0.92 | -0.82 | -0.6 | 0 | -0.3 | -0.58 |

| LOT | No. | TEMPERATURE-DEPENDENT SENSITIVITY VARIATION | | | | | |
|---|---|---|---|---|---|---|---|
| | | -5 | 0 | 10 | 25 | 50 | 70 |
| 1B | 1 | 0.3 | 1.8 | 3.2 | 0 | -2.2 | -5.2 |
| | 2 | -0.2 | 1.4 | 2.5 | 0 | -2.7 | -4.3 |
| | 3 | 2.7 | 4.2 | 4.1 | 0 | -4.0 | -5.0 |
| | 4 | 3.8 | 5.4 | 4.6 | 0 | -4.1 | -8.5 |
| | 5 | 1.7 | 2.6 | 3.6 | 0 | -3.0 | -7.6 |
| | AVE | 1.66 | 3.08 | 3.6 | 0 | -3.18 | -6.12 |
| | MAX | 3.8 | 5.4 | 4.6 | 0 | -2.2 | -4.2 |
| | MIN | -0.2 | 1.4 | 2.5 | 0 | -4.1 | -8.5 |
| | MAX2 | 2.14 | 2.32 | 1.0 | 0 | 0.98 | 1.92 |
| | MIN2 | -1.86 | -1.68 | -1.1 | 0 | -0.92 | -2.38 |

| LOT | No. | TEMPERATURE-DEPENDENT SENSITIVITY VARIATION | | | | | |
|---|---|---|---|---|---|---|---|
| | | -5 | 0 | 10 | 25 | 50 | 70 |
| 2A | 1 | -4.6 | -2.1 | 1.7 | 0 | -0.4 | 0.9 |
| | 2 | -3.8 | -1.2 | 2.3 | 0 | -1.5 | -2.4 |
| | 3 | -4.2 | -2.1 | 2.1 | 0 | -0.4 | 0.2 |
| | 4 | -4.4 | -1.8 | 1.8 | 0 | -1.4 | -0.3 |
| | 5 | -5.7 | -2.9 | 0.9 | 0 | -0.3 | -1.3 |
| | AVE | -4.54 | -2.02 | 1.72 | 0 | -0.8 | -0.58 |
| | MAX | -3.8 | -1.2 | 2.3 | 0 | -0.3 | 0.9 |
| | MIN | -5.7 | -2.9 | 0.9 | 0 | -1.5 | -2.4 |
| | MAX2 | 0.65 | 0.82 | 0.58 | 0 | 0.5 | 1.48 |
| | MIN2 | -1.16 | -0.88 | -0.82 | 0 | -0.7 | -1.82 |

| LOT | No. | TEMPERATURE-DEPENDENT SENSITIVITY VARIATION | | | | | |
|---|---|---|---|---|---|---|---|
| | | -5 | 0 | 10 | 25 | 50 | 70 |
| 2B | 1 | -2.0 | -0.2 | 2.2 | 0 | -1.0 | 0.1 |
| | 2 | -0.8 | 0.5 | 2.3 | 0 | -0.7 | -1.6 |
| | 3 | 1.0 | 1.2 | 2.9 | 0 | -0.3 | -0.7 |
| | 4 | -1.4 | 0.4 | 2.3 | 0 | -1.2 | -1.2 |
| | 5 | -1.9 | 0.4 | 1.8 | 0 | 0 | -1.1 |
| | AVE | -1.38 | 0.38 | 2.3 | 0 | -0.64 | -0.86 |
| | MAX | -0.8 | 1.2 | 2.9 | 0 | 0 | 0.1 |
| | MIN | -2.0 | -0.2 | 1.8 | 0 | -1.2 | -1.6 |
| | MAX2 | 0.58 | 0.82 | 0.6 | 0 | 0.64 | 0.96 |
| | MIN2 | -0.62 | -0.58 | -0.5 | 0 | -0.56 | -0.74 |

FIG.14

| TEMPERATURE CORRECTION | MEASUREMENT ERROR | TYPE01 | | TYPE02 | |
|---|---|---|---|---|---|
| | | A(ch) | B(ch) | A(ch) | B(ch) |
| NOT CORRECTED | MAX | 2.2 | 5.4 | 2.3 | 2.9 |
| | MIN | -5.0 | -8.5 | -5.7 | -2.0 |
| | DIFFERENCE | 7.2 | 13.9 | 8 | 4.9 |
| CORRECTED | MAX | 0.98 | 2.14 | 1.48 | 0.96 |
| | MIN | -0.92 | -2.38 | -1.82 | -0.74 |
| | DIFFERENCE | 1.9 | 4.52 | 3.3 | 1.7 |

IMAGE SENSING APPARATUS

This application is based on Japanese patent application No. 2003-154833 filed on May 30, 2003, the contents of which are hereby incorporated by references.

BACKGROUND OF THE INVENTION

1. Field of the Invention

This invention relates to an image sensing apparatus, such as a digital camera and digital video camera, which can correct a shake thereof.

2. Description of the Related Art

There has been known a mechanism provided in an image sensing apparatus such as a camera which can correct a shake of the apparatus resulting from a photographer. The conventional shake correcting mechanism includes a gyro as an example of shake detection sensors. The image sensing apparatus provided with such a shake correcting mechanism where an angular velocity of a shake of the image sensing apparatus is detected by the gyro, a shake amount of the image sensing apparatus is calculated based on the detected angular velocity, and a moving amount of an image sensor or a shake correction optical system is calculated based on the calculated shake amount so as to move the image sensor or the shake correction optical system depending on the calculated moving amount to thereby correct the shake of the image sensing apparatus.

A gyro is a device incorporated with a piezoelectric element. The incorporated piezoelectric element is oscillated when a voltage is applied thereto. A symmetrical property of the piezoelectric element with respect to an axis of oscillation is collapsed by Coriolis action which acts on the piezoelectric element at a right angle to the direction of oscillation when an angular velocity is applied to the oscillating piezoelectric element. As a result of collapse of the symmetrical property, a distortion is generated in the oscillating piezoelectric element, and electric charges are generated therefrom. The gyro measures the angular velocity in terms of the generated electric charges.

The output voltage or detection sensitivity outputted from the gyro provided with the piezoelectric element has a dependency on a temperature characteristic inherent to the material composing the piezoelectric element. Accordingly, in the case of performing shake correction with use of a gyro, it is necessary to perform temperature correction considering the temperature characteristic of the piezoelectric element to secure the detection sensitivity of the gyro.

One approach to perform temperature correction taking into consideration of a temperature characteristic of a piezoelectric element is to provide a resistor for temperature correction so as to correct a measurement error resulting from a change in temperature, as disclosed in Japanese Unexamined Patent Publication No. 11-344344.

Shakes in an image sensing apparatus such as a camera are generated primarily at the time when a photographer depresses a shutter release button of the apparatus. Accordingly, shakes in pitch direction are generally larger than those in yaw direction of the apparatus.

In view of the above, a conventional image sensing apparatus has been designed to improve measurement precision of the gyro by increasing the number of samplings per unit time of shake detection in pitch direction compared with the number of samplings per unit time of shake detection in yaw direction, as disclosed in Japanese Unexamined Patent Publication No. 2001-290183.

In the former publication, however, since the resistor is additionally provided in the gyro to correct a measurement error resulting from a temperature change, a production cost rise concerning the gyro is inevitable.

In the latter publication, a change in the number of samplings per unit time between shake detections in yaw direction and in pitch direction necessitates a change in sampling frequency between the shake detections in yaw direction and in pitch direction, which makes the circuit configuration of the gyro complicated.

SUMMARY OF THE INVENTION

It is an object of the present invention to provide an image sensing apparatus which is free from the problems residing in the prior art.

It is another object of the invention to provide an image sensing apparatus which enables to correct shakes of the apparatus at a low cost and with high precision.

According to an aspect of the invention, an image sensing apparatus comprises a first shake detector which detects a shake of the image sensing apparatus in a first direction, a second shake detector which detects a shake of the image sensing apparatus in a second direction, the second shake detector having a detection characteristic different from that of the first shake detector, and a shake corrector which corrects a shake of the image sensing apparatus based on outputs from the first shake detector and the second shake detector.

These and other objects, features and advantages of the present invention will become more apparent upon a reading of the following detailed description and accompanying drawing.

BRIEF DESCRIPTION OF THE DRAWINGS

FIG. 7A is a table showing a relationship between a voltage to be applied to a control terminal, and a direction of applied voltage to an electrical/mechanical converting element;

FIGS. 7B through 7D are diagrams showing a driving circuit used in the camera, specifically showing various control states in an H-bridge circuit when a drive voltage is applied to an electrical/mechanical converting element;

FIG. 14 is a diagram showing differences in measurement error with respect to a variety of gyros different in type and in channel between a case that temperature correction is provided and a case that temperature correction is not provided.

DETAILED DESCRIPTION OF THE PREFERRED EMBODIMENTS OF THE INVENTION

Figure 1:
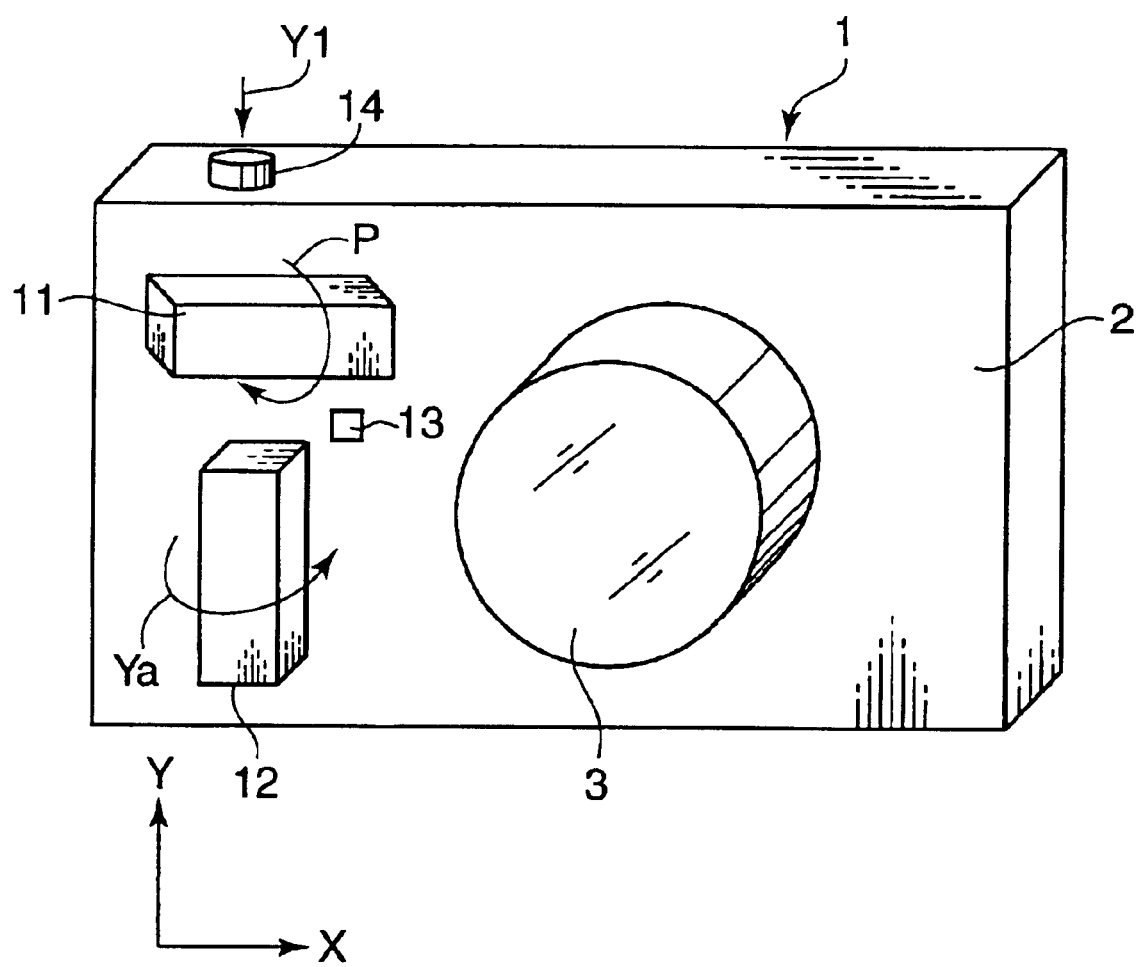
FIG. 1 is a diagram showing an external appearance of a camera having a shake correction function in accordance with an embodiment of the invention, showing primary components of the camera.

Preferred embodiments of the invention are described referring to the accompanying drawings. However, it should be noted that like reference numerals designate like or corresponding parts, and repeated description on like reference numerals will be avoided.

Referring to FIG. 1, a camera 1 incorporated with a shake correction function includes a main body 2 and a taking lens 3 provided substantially in the middle on the front face of the main body 2. The camera 1 is internally provided with a gyro unit 11 for detecting a shake in a pitch direction of the camera 1 (hereinafter, called as "pitch gyro unit"), a gyro unit 12 for detecting a shake in a yaw direction of the camera 1 (hereinafter, called as "yaw gyro unit"), and a temperature sensor 13. A shutter release button 14 is provided at a left end on the top surface of the main body 2 viewed from the front. In this embodiment, horizontal directions relative to the camera 1 in FIG. 1 are called as "X-directions or X-axis directions", vertical directions relative to the camera 1 are called as "Y-directions, or Y-axis directions", rotating directions (pitch directions) about the X-axis are called as "P-directions", and rotating directions (yaw directions) about the Y-axis are called as "Ya-directions", respectively.

Figure 2:
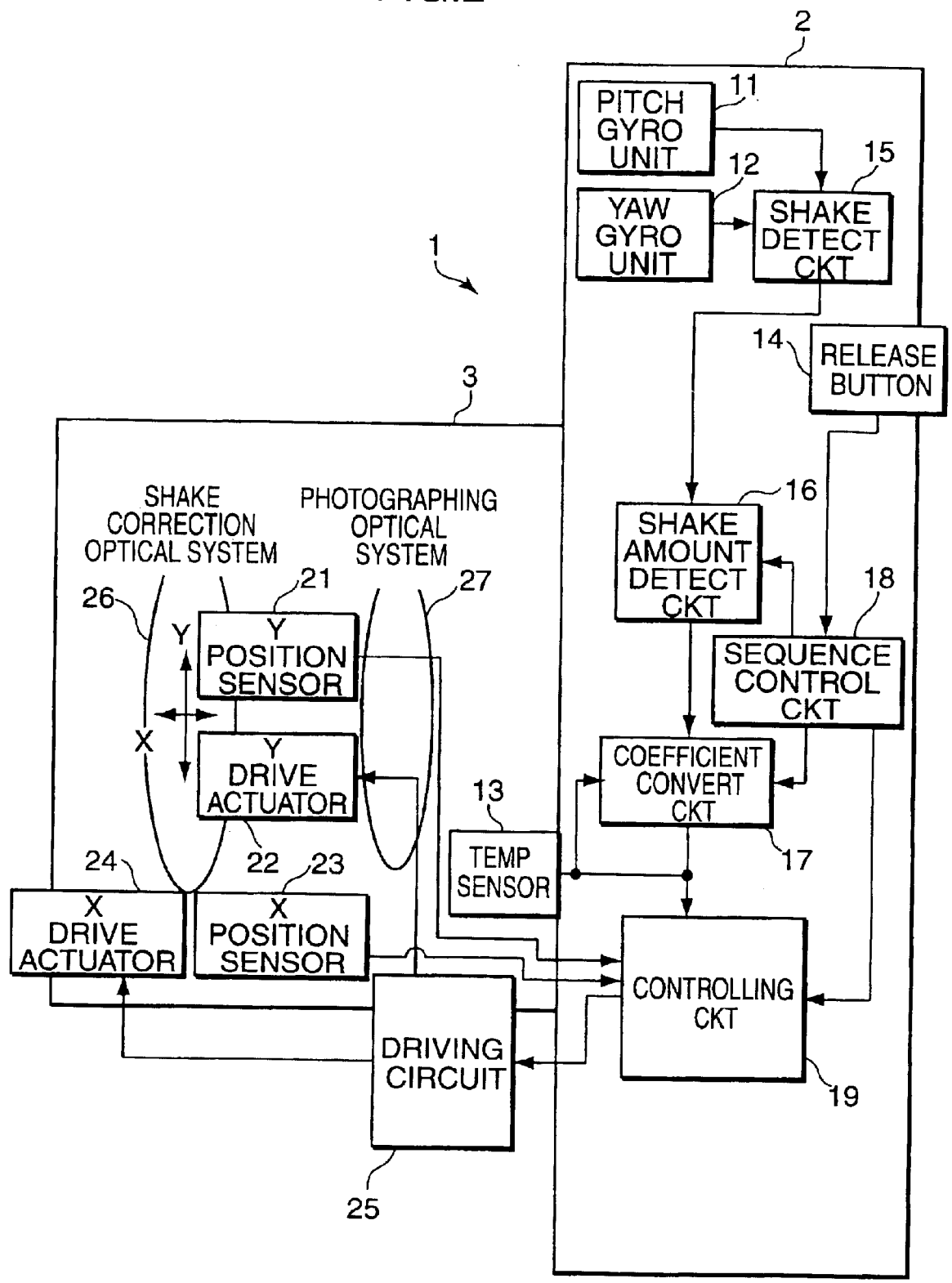
FIG. 2 is a block diagram schematically showing an arrangement of the camera shown in FIG. 1.

Referring to FIG. 2, the camera 1 is comprised of the main body 2 and the taking lens 3. The camera main body 2 is incorporated with the pitch gyro unit 11, the yaw gyro unit 12, the shutter release button 14, a shake detecting circuit 15, a shake amount detecting circuit 16, a coefficient converting circuit 17, a sequence controlling circuit 18, and a controlling circuit 19. The taking lens 3 is incorporated with a Y-direction position sensor 21, a Y-direction drive actuator 22, an X-direction position sensor 23, an X-direction drive actuator 24, a driving circuit 25, a shake correction optical assembly 4, and a photographing optical system 27, as well as the temperature sensor 13.

First, the arrangement of the camera main body 2 is described. The shutter release button 14 is rendered to a photographing preparatory state by being partially depressed in the Y1-direction in FIG. 1. When the camera 1 is rendered to a photographing preparatory state, auto focusing function of automatically focusing an object image, auto exposure function of automatically determining the exposure, and shake correction function are activated. The shake correction function is continuously activated, while the shutter release button 14 is partially depressed, to facilitate an image framing operation of the camera 1. The camera 1 is ready for photographing when a photographer fully depresses the shutter release button 14 in the Y1-direction in FIG. 1, and the shutter release button 14 is rendered to a fully depressed state. Specifically, when the shutter release button 14 is rendered to a fully depressed state, exposure control is performed so as to attain a proper exposure by an image sensor (not shown) depending on the exposed state determined by the auto exposure function. Proper shake correction control is performed so as to keep on correcting shakes of the camera while photographing is conducted in a dark place because the shutter speed is retarded in the dark place and accordingly, a camera shake is likely to occur during the photographing operation in such a dark place.

As mentioned above, since the camera 1 is so constructed as to depress the shutter release button 14 in the Y1-direction in FIG. 1, a shake in P-direction in FIG. 1 is greater than a shake in Ya-direction in FIG. 1. Accordingly, it is preferable to improve correction performance of correcting a shake in P-direction than correction performance of correcting a shake in Ya-direction to enhance the overall shake correction performance of the camera 1.

The pitch gyro unit 11 is a gyro sensor for detecting a shake of the camera 1 in P-direction. The yaw gyro unit 12 is a gyro sensor for detecting a shake of the camera 1 in Ya-direction. A gyro sensor is adapted to detect the angular velocity of a shake of the target (in this embodiment, the camera 1) corresponding to an angular displacement (swing) of the camera. More specifically, the gyro sensor is incorporated with a piezoelectric element which is oscillated when a voltage is applied thereto. When the piezoelectric element is angularly displaced resulting from a shake of the camera 1, and is applied with an angular velocity, Coriolis action is exerted to the piezoelectric element at a right angle to the oscillating direction, and a distortion is generated in the oscillating piezoelectric element. The gyro sensor detects the angular velocity by extracting the distortion in terms of an electrical signal.

In the camera 1, a gyro having a higher precision in shake detection e.g. a gyro having a smaller temperature-dependent sensitivity variation of the gyro is used as the pitch gyro unit 11, while a gyro having a larger variation in sensitivity is used as the yaw gyro unit 12.

A signal indicative of an angular velocity in P-direction detected by the pitch gyro unit 11, and a signal indicative of an angular velocity in Ya-direction detected by the yaw gyro unit 12 are respectively inputted to the shake detecting circuit 15. The shake detecting circuit 15 is comprised of a filter circuit (a combination of a low-pass filter and a high-pass filter) for reducing noises and drifts from the respective angular velocity signals in P-direction and Ya-direction, and an amplifying circuit for amplifying the respective angular velocity signals.

The angular velocity signals in P-direction and Ya-direction outputted from the shake detecting circuit 15 are inputted to the shake amount detecting circuit 16. The shake amount detecting circuit 16 reads the respective angular velocity signals at a certain time interval. The respective angular velocity signals inputted to the shake amount detecting circuit 16 are outputted to the coefficient converting circuit 17 as a shake amount detx of the camera 1 in X-direction and a shake amount dety of the camera 1 in Y-direction, respectively.

The coefficient converting circuit 17 converts the shake amounts data (detx, dety) in X-direction and Y-direction into moving amounts (px, py) in the respective directions, while correcting the shake amounts, considering a variation inherent to the shake correction optical systems of the cameras individually (hereinafter, called as "individual difference"), and the ambient temperature. The individual difference is, for example, stored in a memory (not shown) built in each of the camera main bodies by carrying out inspection of the shake correction optical systems individually and storing actual measurement data in the memory of each of the camera main bodies at the time of shipment thereof. The temperature characteristic of each gyro (piezoelectric element) is also stored in the memory by actual measurement, for example.

The signals indicating the respective moving amounts (px, py) outputted from the coefficient converting circuit 17 are outputted to the controlling circuit 19. The controlling circuit 19 converts the signals indicating the respective moving amounts (px, py) into driving signals (drvx, drvy), taking into consideration of a change in environment such as the ambient temperature or change in properties with time, which may affect the driving circuit 25, the X-direction position sensor 23, the X-direction drive actuator 24, the Y-direction position sensor 21, and the Y-direction drive actuator 22.

The respective driving signals (drvx, drvy) in X-, Y-directions outputted from the controlling circuit 19 are outputted to the driving circuit 25.

The operations of the shake amount detecting circuit 16, the coefficient converting circuit 17, and the controlling circuit 19 are controlled by the sequence controlling circuit 18. Specifically, in response to full depression of the shutter release button 14, the sequence controlling circuit 18 controls the shake amount detecting circuit 16 to output the respective shake amounts (detx, dety) in X-, Y-directions to the coefficient converting circuit 17. Next, the sequence controlling circuit 18 controls the coefficient converting circuit 17 to convert the respective shake amounts (detx, dety) into the respective moving amounts (px, py). The sequence controlling circuit 18, then, controls the controlling circuit 19 to calculate operation values, namely, drive signals (drvx, drvy) for driving the X-direction drive actuator 24 and the Y-direction drive actuator 22 based on the respective moving amounts (px, py) outputted from the coefficient converting circuit 17 so as to output the drive signals (drvx, drvy) to the driving circuit 25. The above operations are cyclically repeated at a certain time interval during a time from detection of the full depression of the shutter release button 14 until an exposure is completed, and thus performing shake correction. Generally, it is said that a camera shake is a combination of quivering of a muscle of a body (photographer) which has such a small amplitude as around 10 Hz, a body shake which has such a large amplitude as 3 Hz or less, and a shake of the camera exerted thereto in response to depression of the shutter release button 14 which has such a relatively large amplitude as about 5 Hz. In view of this, in this embodiment, shake correction is performed at a time interval of 0.0005 seconds (2 kHz).

The sequence controlling circuit 18 is activated to control an unillustrated circuit to execute a photographing preparatory operation such as light metering and object distance detection in response to detection of a partial depression of the shutter release button 14, and is activated to perform an actual photographing operation such as driving of a lens for focus adjustment in response to detection of a full depression of the shutter release button 14.

Next, an arrangement of the taking lens 3 is described referring to FIG. 2. The temperature sensor 13 provided in the taking lens 3 includes, for example, a thermistor. The temperature sensor 13 detects the ambient temperature inside the camera 1 and outputs a detection result to the coefficient converting circuit 17 and to the controlling circuit 19 in the camera main body 2. The detection result is utilized to correct a variation in the output signal due to a variation in the characteristics of various parts of the camera depending on a change in temperature. Correction of such a variation includes correction of a temperature-dependent variation of the shake correction optical system 26, the X-direction position sensor 23, and the Y-direction position sensor 21, and correction of basic driving frequencies and drive voltages of the X-direction drive actuator 24 and the Y-direction drive actuator 22. These detection results are stored in the memory (not shown) of the camera main body 2 in the format of a lookup table in which correction values in correlation to the temperatures are stored with respect to each characteristic.

The photographing optical system 27 focuses an object light image on the sensing plane thereof. The shake correction optical system 26 includes a lens for shake correction, and is adapted to refract a light image from an object.

The Y-direction position sensor 21 detects the position of the shake correction optical assembly 4 in Y-direction, and outputs a detection result to the driving circuit 25. The Y-direction drive actuator 22 is, for example, an impact type piezoelectric actuator employing a piezoelectric element. The Y-direction drive actuator 22 moves the shake correction optical assembly 4 in Y-direction in response to a drive voltage outputted from the driving circuit 25. The X-direction position sensor 23 detects the position of the shake correction optical assembly 4 in X-direction, and outputs a detection result to the driving circuit 25. The X-direction drive actuator 24 is, for example, an impact type piezoelectric actuator employing a piezoelectric element. The X-direction drive actuator 24 moves the shake correction optical assembly 4 in X-direction in response to a drive voltage outputted from the driving circuit 25.

The Y-direction position sensor 21 and the X-direction position sensor 23 are each constructed such that an infrared-ray-emitting diode (IRED) and a slit member are mounted on a movable side thereof, while a position sensitive device (denoted at PSD in FIG. 4) is mounted on a fixed side thereof. Outputs from the Y-direction position sensor 21 and the X-direction position sensor 23 are inputted to the controlling circuit 19. The driving circuit 25 feeds drive voltages corresponding to the drive signals (drvx, drvy) sent from the controlling circuit 19 to the Y-direction drive actuator 22 and the X-direction drive actuator 24 respectively based on the control signals outputted from the controlling circuit 19 in the camera main body 2.

Figure 3:
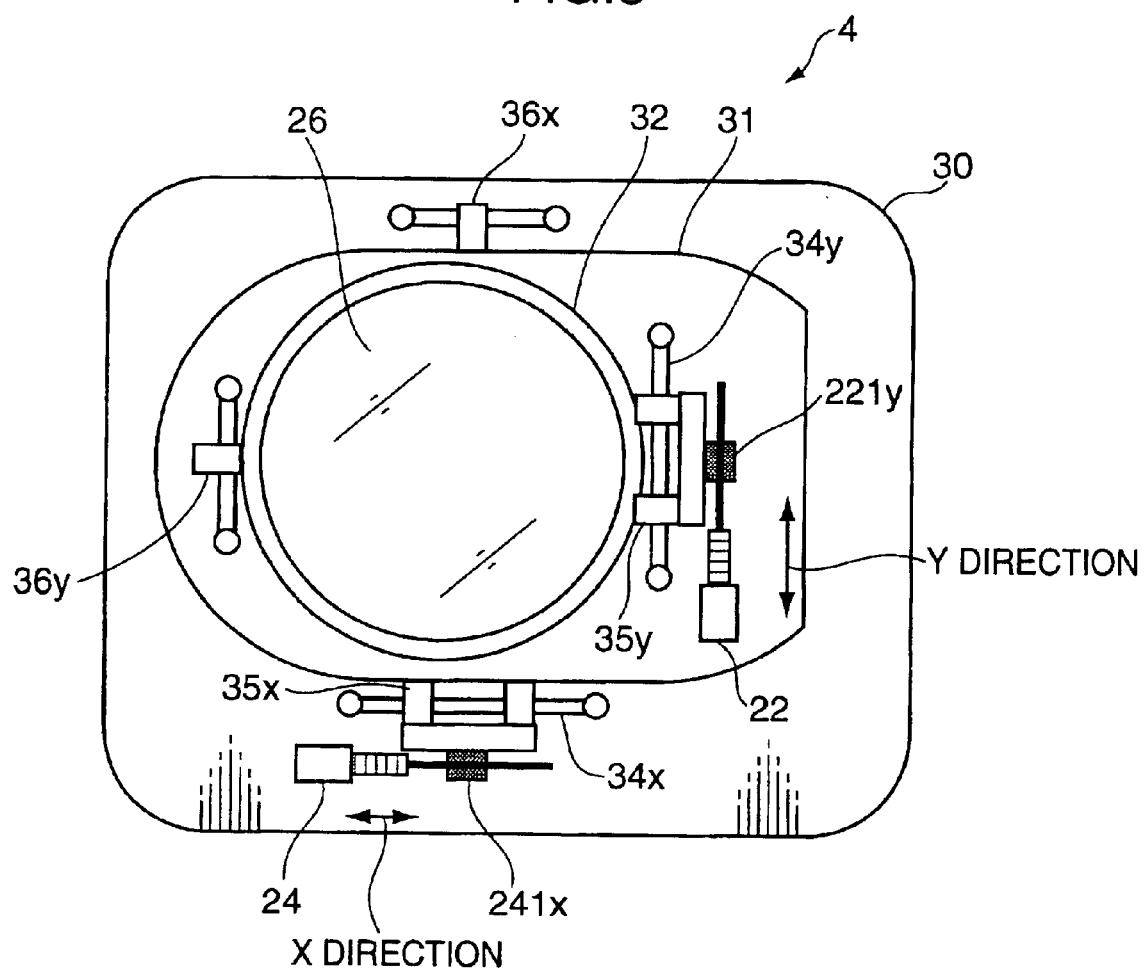
FIG. 3 is a diagram schematically showing an arrangement of a shake correction optical assembly provided in the camera.

Next, an arrangement of the shake correction optical assembly 4 is described referring to FIG. 3. The shake correction optical assembly 4 includes the Y-direction drive actuator 22, the X-direction drive actuator 24, the shake correction optical system 26, a base block 30, a base plate 31, a lens frame 32, an Y-direction sliding shaft 34y, an X-direction sliding shaft 34x, an Y-direction sliding guide member 35y, an X-direction sliding guide member 35x, an Y-direction sub guide member 36y, and an X-direction sub guide member 36x.

The base block 30 is a member on which the respective parts of the shake correction optical assembly 4 are mounted. The base block 30 is fixedly supported on a camera cone of the taking lens 3. The X-direction drive actuator 24 is, for example, an impact type piezoelectric actuator in which a piezoelectric element is fixedly mounted, and is fixedly mounted on the base block 30 transversely. Specifically, the directions along which a movable member 241x of the X-direction drive actuator 24 is moved are defined as X-directions in FIG. 3.

The X-direction slide guide member 35x is a substantially U-shaped driving force transmitter equipped with a pair of projecting sliders projecting vertically (in Y-direction) at its opposite ends on a base portion thereof. The base portion of the slide guide member 35x is fixedly attached to the movable member 241x. Each of the sliders of the slide guide member 35x has one end thereof fixedly attached to the base portion of the slide guide member 35x, and the other end thereof fixedly attached to the base plate 31. Each of the sliders is formed with a through-hole through which the sliding shaft 34x extends so that the X-direction slide guide member 35x is reciprocable along the axis of the sliding shaft 34x. The sliding shaft 34x has its opposite ends fixed to the base plate 31 spaced apart therefrom by a certain clearance to render the slide guide shaft 35x reciprocable along the axis of the sliding shaft 34x.

The X-direction sub guide member 36x is provided on the opposite side of the X-direction slide guide member 35x with respect to the base plate 31. The sub guide member 36x has a slider and a slider shaft. The slider of the sub guide member 36x is fixedly attached to the base plate 31, and is formed with a through-hole through which the slider shaft extends. The slider shaft has its opposite ends fixed to the base plate 31 spaced apart therefrom by a certain clearance to render the slider reciprocable along the axis of the slider shaft. With this arrangement, the X-direction slide guide member 35x together with the sub guide member 36x allows the base plate 31 to be reciprocable in X-directions smoothly, while keeping the base plate 31 from being tilted relative to the direction of the optical axis of the shake correction optical assembly 4.

The Y-direction drive actuator 22 is, for example, an impact type piezoelectric actuator in which a piezoelectric element is fixedly mounted, and is mounted on the base plate 31 in a direction orthogonal to X-direction.

The Y-direction slide guide member 35y is a substantially U-shaped driving force transmitter equipped with a pair of projecting sliders projecting horizontally (in X-direction) at its opposite ends on a base portion thereof. The base portion of the slide guide member 35y is fixedly attached to a movable member 221y. Each of the sliders of the slide guide member 35y has one end thereof fixedly attached to the base portion of the slide guide member 35y, and the other end thereof fixedly attached to the lens frame 32. Each of the sliders is formed with a through-hole through which the sliding shaft 34y extends so that the Y-direction slide guide member 35y is reciprocable along the axis of the sliding shaft 34y. The sliding shaft 34y has its opposite ends fixed to the base plate 31 spaced apart therefrom by a certain clearance to render the slide guide shaft 35y reciprocable along the axis of the sliding shaft 34y.

The Y-direction sub guide member 36y is provided on the opposite side of the Y-direction slide guide member 35x with respect to the base plate 31. The sub guide member 36y has a slider and a slider shaft. The slider of the sub guide member 36y is fixedly attached to the base plate 31, and is formed with a through-hole through which the slider shaft extends. The slider shaft has its opposite ends fixed to the base plate 31 spaced apart therefrom by a certain clearance to render the slider reciprocable along the axis of the slider shaft. With this arrangement, the Y-direction slide guide member 35y together with the sub guide member 36y allows the base plate 31 to be reciprocable in Y-directions smoothly, while keeping the lens frame 32 from being tilted relative to the direction of the optical axis of the shake correction optical assembly 4. The lens frame 32 is a retainer for retaining the shake correction optical assembly 4.

With the above arrangement, the shake correction optical system 26 refracts rays of light from an object in respective directions while continuously correcting shakes of the camera in X-, Y-directions in an optimal control (velocity) state based on positioning servo-control by the controlling circuit 19. Thus, a continuous shake correction is executable.

Figure 4:
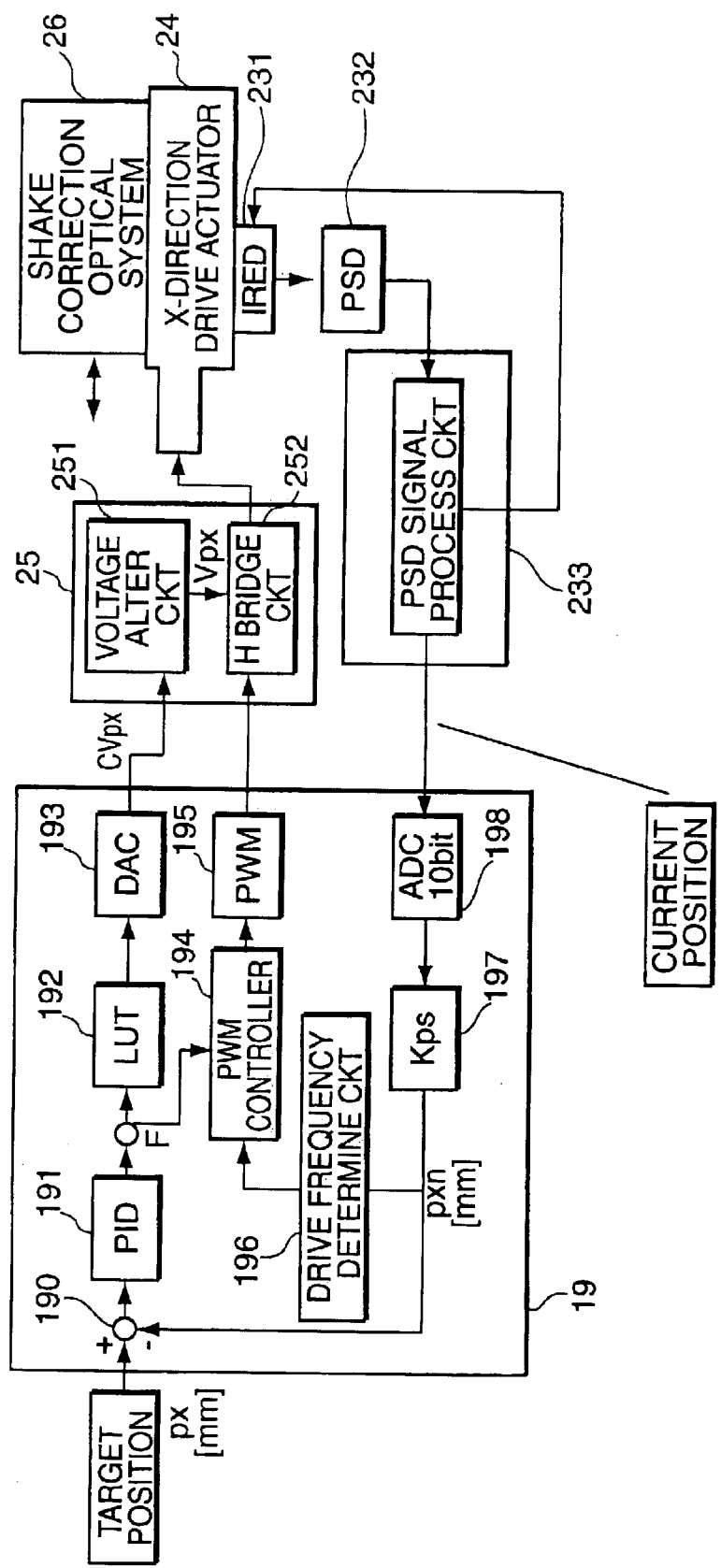
FIG. 4 is a block diagram showing a configuration of a controlling circuit and its peripheral circuits of the camera.

Next, the controlling circuit 19 and a peripheral circuit thereof are described. Since shake correction is performed with respect to X-direction and Y-direction, respectively, it is necessary to provide an arrangement of controlling the X-direction drive actuator 24 and an arrangement of controlling the Y-direction drive actuator 22. Since these arrangements are identical to each other, FIG. 4 shows the arrangement of controlling the X-direction drive actuator 24, while omitting the arrangement of controlling the Y-direction drive actuator 22. In the following, description on the arrangement of controlling the Y-direction drive actuator 22 is omitted for the above reason.

Referring to FIG. 4, the controlling circuit 19 includes a subtracting circuit 190, a proportional integration and differential (PID) circuit 191, a lookup table circuit (LUT) 192, a digital-to-analog converter (DAC) 193, a pulse width modulation (PWM) controller 194, a PWM circuit 195, a driving frequency determining circuit 196, a unit converting circuit 197, and an analog-to-digital converter (ADC) 198. The driving circuit 25 includes a voltage altering circuit 251 and an H-bridge circuit 252. The X-direction position sensor 23 includes an infrared-ray-emitting diode (IRED), a position sensitive device (PSD) 232, and a PSD signal processing circuit 233.

An infrared ray emitted from the IRED 231 mounted on the movable member 241x of the X-direction drive actuator 24 is incident on the PSD 232 through the slit member. Upon incident of the infrared ray, the PSD 232 detects the infrared ray, and outputs a detection result to the PSD signal processing circuit 233. The PSD signal processing circuit 233 executes signal processing in such a manner that an analog voltage representing the current position pxn of the movable member 241x, namely, the current position of the shake correction optical assembly 4 in X-direction is outputted to the ADC 198 of the controlling circuit 19.

The ADC 198 is an analog-to-digital converting circuit, and converts an analog voltage representing the current position pxn of the shake correction optical assembly 4 to a digital signal of 10-bit and outputs the digital signal to the unit converting circuit 197. The unit converting circuit 197 multiplies the digital signal representing the current position pxn by a constant (=Kps) so that the unit of the value after the multiplication is the same as the unit of the target position px which has been outputted from the coefficient converting circuit 17. The signal representing the current position which is multiplied by Kps is outputted to the driving frequency determining circuit 196, as well as to the subtracting circuit 190 to which the signal indicating the target position px has been outputted.

The driving frequency determining circuit 196 calculates a frequency for driving the actuator, taking into consideration of an individual difference of the shake correction optical assembly 4 and a temperature characteristic of the piezoelectric element based on a basic driving frequency of the actuator, which is a driving frequency of the actuator under a specific condition. Specifically, the driving frequency determining circuit 196 calculates a driving frequency by revising the basic driving frequency depending on an individual difference of the shake correction optical assembly 4 and the ambient temperature inside the camera. The individual difference of the shake correction optical assembly 4 at a certain driving frequency is, for instance, stored in the memory (not shown) of the camera main body in terms of correction values which are obtained by actual measurement in an inspection executed at the time of shipment. The temperature characteristics of the driving frequencies are also stored in the memory as a temperature correction table by actual measurement or its equivalent, wherein correction values regarding the basic driving frequency are stored at a certain temperature interval. The signal indicating the driving frequency calculated by the driving frequency determining circuit 196 is outputted to the PWM controller 194. In this way, the basic driving frequency is revised by the driving frequency determining circuit 196. With this arrangement, even if the camera encounters an individual difference of the shake correction optical assembly 4 and a change in the ambient temperature, a proper basic driving frequency is obtained.

The subtracting circuit 190 subtracts a signal indicating the current position pxn from a signal indicating the target position px which is outputted from the coefficient converting circuit 17 to the controlling circuit 19. The difference between the target position pn and the current position pxn is outputted to the PID 191 as a control difference signal. The PID 191 determines a gain concerning proportion, differentiation, and integration to obtain an optimal operation value corresponding to the difference between the target position px and the current position pxn. The control difference signal amplified with use of the gain is outputted to the lookup table circuit 192 and to the PWM controller 194.

Figure 5:
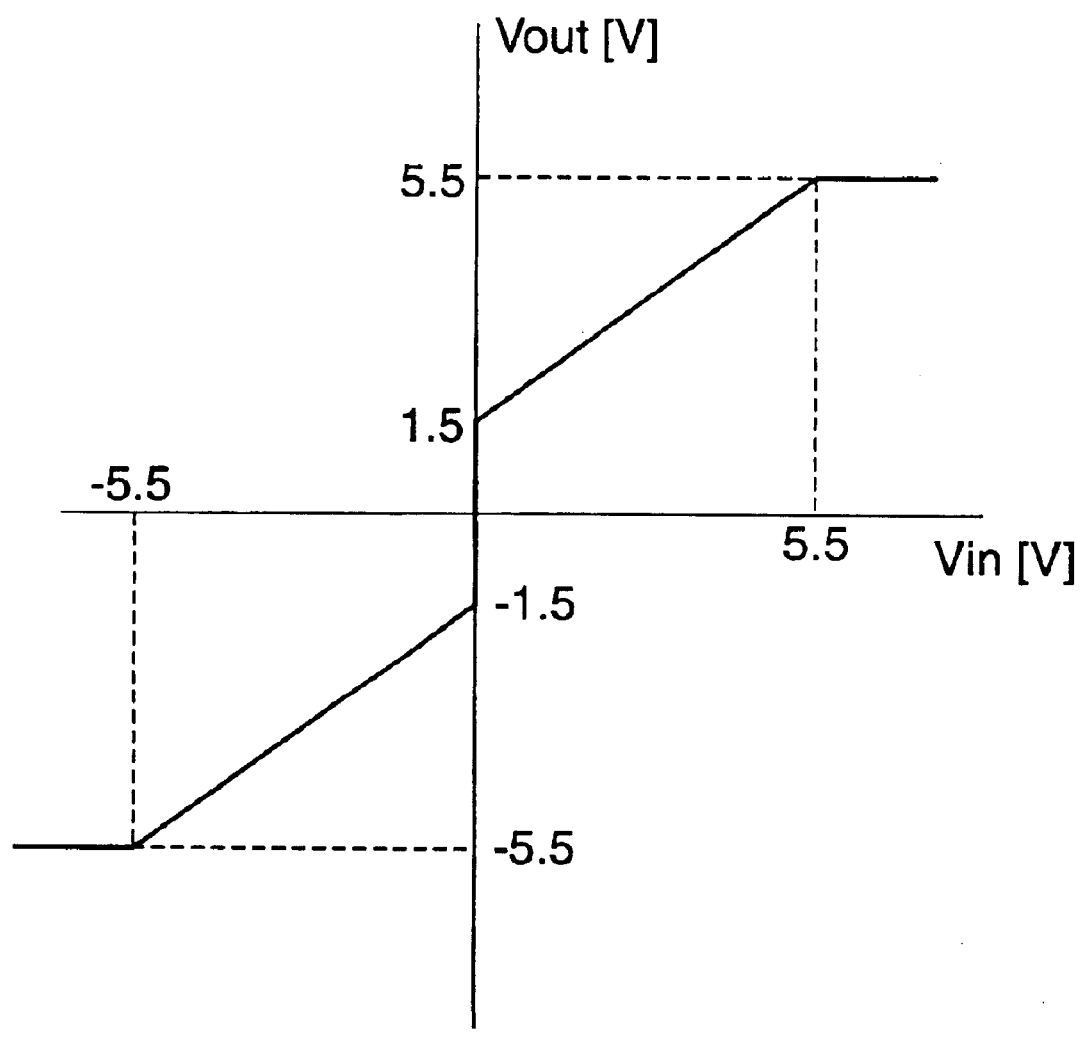
FIG. 5 is a graph showing an exemplary characteristic of an output voltage in a driving system of the camera in preparing a voltage lookup table.

The lookup table 192 determines a voltage (drive voltage) of a direct-current power source Vp in accordance with the control difference signal by referring to a lookup table (voltage lookup table) concerning the voltage from the memory. The determined voltage (drive voltage) is outputted to the DAC 193. At this time, the lookup table circuit 192 sets a gain concerning a non-linear portion of the signal component, which is difficult to be set by means of proportional gain, differentiation gain (gain concerning a high-frequency component) or the like. For instance, in the case of the driving system in this embodiment, a voltage in the range from 0 to 1.5V is regarded as 1.5V and outputted as such in view of the fact that voltage application in this range (non-sensitive zone) does not activate the piezoelectric element owing to a frictional contact of piezoelectric pieces of the piezoelectric element against each other. Also, the maximal value of the applied voltage is so regulated as to avoid an unnecessary heated state of the driving system in view of securing durability of the driving system. The voltage lookup table is thus prepared to realize, for example, the characteristic shown in FIG. 5, wherein Vin denotes input voltage, and Vout denotes output voltage. More specifically, the table is prepared in such a manner that: while the input voltage is −5.5V or less, the output voltage is kept at a constant level of −5.5V; while the input voltage is such that −5.5V≦Vin<0V, the output voltage attains the equation: (Vout)=(4/5.5)×(Vin) −1.5; while the input voltage is such that 0V≦Vin≦5.5V, the output voltage attains the equation: (Vout)=(4/5.5)×(Vin)+1.5: and while the input voltage is not smaller than 5.5V, the output voltage is kept at a constant level of 5.5V.

The DAC 193 is a digital-to-analog converting circuit, and converts a drive voltage of 8-bit to an analog voltage to be outputted to the driving circuit 25. In the case that the driving circuit 25 is a circuit as configured in FIGS. 7B to 7D, the DC-power voltage Vp is changed to a drive voltage determined in the lookup table circuit 192. Thereby, the moving members 241x and 221y, namely, the shake correction optical system 26 is continuously driven at a predetermined time interval so as to perform shake correction while an object image is picked up or exposed during an opening of the shutter.

The PWM controller 194 determines the moving direction of the shake correction optical system 26 in response to plus (minus) of the control difference signal from the PID circuit 191, and sets the duty ratio D to 3:7 while the symbol of the control difference signal is plus, whereas setting the duty ratio to 7:3 while the symbol is minus. The PWM controller 194 outputs a control signal to the PWM circuit 195 in such a manner that a generally rectangular waveform voltage is generated at the driving frequency calculated by the driving frequency determining circuit 196 and at the set duty ratio D. The PWM circuit 195 generates a drive voltage in the form of a rectangular waveform, and supplies the drive voltage to the H-bridge circuit 252 of the driving circuit 25. Circuits as exemplified in FIGS. 7B to 7D are utilized as the H-bridge circuit 252, which will be described in a later section.

An electrical/mechanical converting element of the X-direction drive actuator 24 is driven by the H-bridge circuit 252. The X-direction drive actuator 24 moves the shake correction optical system 26 in X-direction toward the target position at a certain velocity. The controlling circuit 19 continuously drives the shake correction optical system 26 by applying an optimal voltage to the H-bridge circuit 252 by way of the PID circuit 191, the lookup table circuit 192, and the PWM controller 194 based on a difference between the updated target position px and the current position pxn, and by continuously supplying an optimal drive pulse signal from the PWM controller 194 and the PWM circuit 195 to the H-bridge circuit 252. With this arrangement, shake correction is continuously carried out while the shutter is opened.

Next, described is an operation of the camera having a shake correction function. When the shutter release button 14 is fully depressed by a photographer, the sequence controlling circuit 18 controls the shake amount detecting circuit 16 and the coefficient converting circuit 17 to convert the respective angular velocities in P-, Ya-directions detected by the pitch gyro unit 11 and the yaw gyro unit 12 to signals indicating a target position in the respective X-, Y-directions along which the shake correction optical system 26 is to be moved, and output the converted signals to the controlling circuit 19.

Since the operation of the X-direction drive actuator 24 is identical to that of the Y-direction drive actuator 22, in the following, the operation of the X-direction drive actuator 24 is described while omitting the operation of the Y-direction drive actuator 22.

The controlling circuit 19 acquires a signal indicating the current position pxn of the shake correction optical system 26 from the X-position sensor 23. The signal indicating the current position pxn is converted to a digital signal in the ADC 198, and then converted to a signal in the same unit as the signal indicating the target position px in the unit converting circuit 197. The signal indicating the converted current position pxn is outputted to the driving frequency determining circuit 196, and to the subtracting circuit 190 to which the signal indicating the target position px has been inputted.

The subtracting circuit 190 calculates a control difference signal by subtracting the current position data pxn from the target position data px. After the aforementioned processing is executed in the PID circuit 191, the control difference signal is outputted to the lookup table circuit 192 and to the PWM controller 194. The lookup table circuit 192 determines the drive voltage value Vpx based on the control difference signal by referring to the voltage lookup table stored in the memory. After the voltage Vpx is converted to an analog signal by the DAC 193, the analog signal is outputted to the voltage altering circuit 251 of the driving circuit 25. Thus, the DC voltage in the driving circuit 25 is set as the voltage Vpx.

On the other hand, the driving frequency determining circuit 196 judges whether the correction value corresponds to the detected ambient temperature by referring to a temperature correction table stored in the unillustrated memory, based on the ambient temperature detected by the temperature sensor 13 upon receiving the signal indicating the current position pxn. The driving frequency determining circuit 196 determines the driving frequency by revising the basic driving frequency stored in the memory based on the correction value corresponding to the individual difference and the ambient temperature stored in the memory. It is not necessary to determine the driving frequency every time positioning servo control is executed for feedback control of shake correction. Alternatively, the driving frequency may be determined at a start-up operation of the camera exclusively, or every predetermined times.

The signal indicating the determined driving frequency is outputted to the PWM controller 194 along with the output from the PID circuit 191. The PWM controller 194 judges the moving directions of the movable members 241x and 221y, namely, the shake correction optical system 26 based on plus or minus of the output from the PID circuit 191, and determines the duty ratio D based on the judgment result. Specifically, while the symbol of the output is plus, the duty ratio D is set to 3:7, whereas the symbol of the output is minus, the duty ratio D is set to 7:3. The PWM controller 194 controls the PWM circuit 195 to thereby output a PWM signal representing the revised driving frequency and the determined duty ratio D to the H-bridge circuit 252 in the driving circuit 25. The H-bridge circuit 252 moves the movable member 241x at a predetermined velocity by driving the electrical/mechanical converting element of the X-direction drive actuator 24 based on the PWM signal indicating that the DC-power voltage is supplied at the value Vpx. Thus, the shake correction optical system 26 is correctively moved at a predetermined velocity for shake correction.

The controlling circuit 19 continuously performs position control of the shake correction optical system 26 at a predetermined time interval while the shutter is opened to pick up or expose an object image. Specifically, the controlling circuit 19 determines an optimal control voltage based on the updated target position px and the updated current position pxn, and cyclically drives the X-direction actuator 24 at a velocity corresponding to the optimal control voltage. The updated target position px is calculated based on an output signal from the pitch gyro unit 11, and the updated current position pxn is acquired based on the output signal from the X-direction position sensor 23. Thus, the positioning servo control is optimized basically in such a manner that the velocity for driving the shake correction optical system 26 is raised by increasing the voltage to be applied to the electrical/mechanical converting element of the X-direction drive actuator 24 in the case where a difference in position (difference between target position px and current position pxn), and a difference in angular velocity before and after shake correction is large. As a result of such a servo control, the shake correction optical system 26 is continuously driven in a state that a difference between the target position px and the current position pxn is minimized.

In this way, in this embodiment, since the frequency of the drive voltage is defined as the basic driving frequency, there is no need of controlling the driving frequency in controlling the driving velocity and position of the shake correction optical system 26. In this embodiment, the driving state of the shake correction optical system 26 can be optimized, and shake correction of high performance can be executed by regulating the value of the drive voltage. Further, in this embodiment, since an impact-type piezoelectric actuator is used as a driver for the shake correction optical system 26, downsizing of the taking lens 3 and power saving thereof can be attained, thereby leading to downsizing of the camera and power saving thereof.

Figure 6:
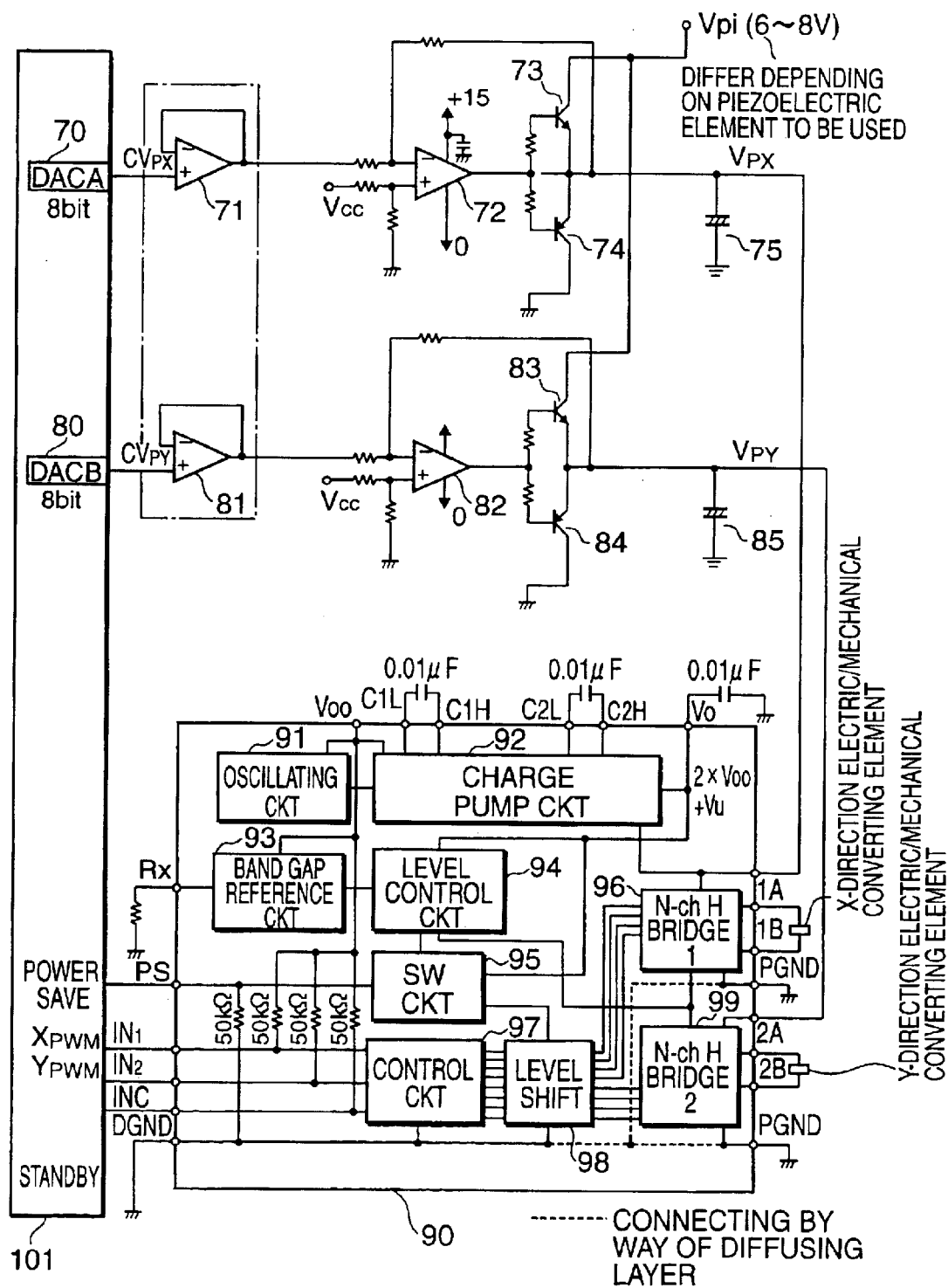
FIG. 6 is a circuit diagram showing a driving circuit of the camera.
Figure 8A:
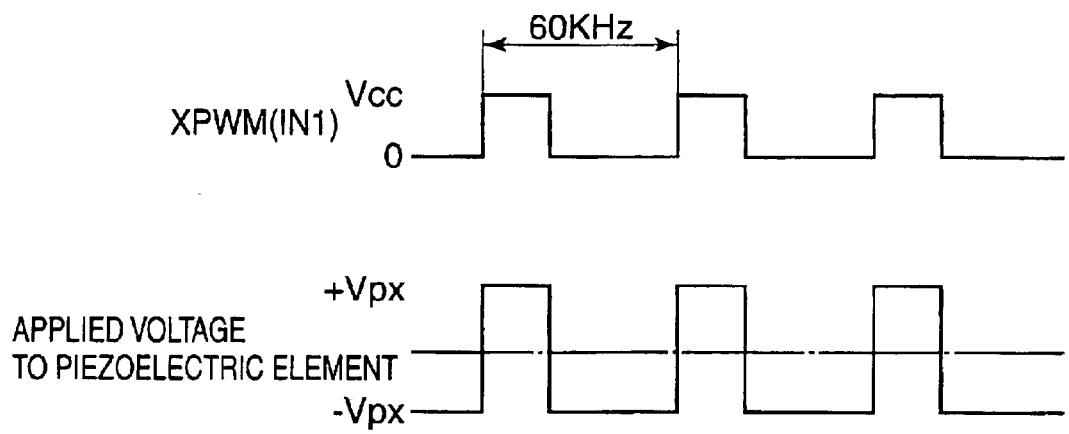
FIGS. 8A and 8B are diagrams showing respective relationships between voltage Vpx to be applied to an X-direction drive actuator, PWM pulse Xpwm for driving the X-direction drive actuator, and an applied voltage to be actually applied to the electrical/mechanical converting element.
Figure 8B:
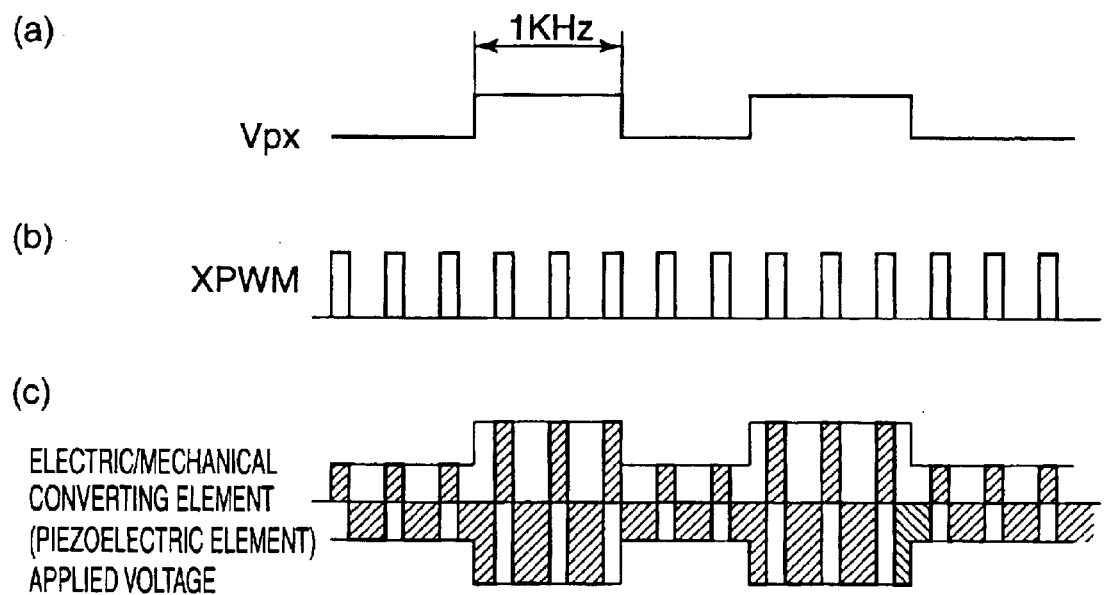

Next, an example of the driving circuit 25 is described referring to FIG. 6. FIGS. 7A to 7D show states of circuit control in terms of a relationship between an H-bridge circuit and an applied voltage to an electrical/mechanical converting element. Specifically, FIG. 7A is a diagram showing a relationship between a voltage to be applied to a control terminal IN1 (IN2 or INC), and a direction of applied voltage to the electrical/mechanical converting element. FIGS. 7B through 7D are diagrams showing a relationship between an on/off state in each switching element of the H-bridge circuit and a moving direction (forward or reverse) of the movable member. FIG. 8A shows a train of pulses indicating the voltage Vpx (drive voltage Vp in X-direction) to be applied to the X-direction drive actuator 24. FIG. 8B shows a set of diagrams showing a relationship between an PWM pulse Xpwm for driving the X-direction drive actuator 24, and an applied voltage to the electrical/mechanical converting element, wherein (a) shows a train of pulses of the voltage Vpx to be applied to the X-direction drive actuator 24, (b) shows a train of PWM pulses Xpwm for driving the X-direction drive actuator 24, and (c) shows a train of pulses corresponding to an actual voltage to be applied to the electric/mechanical converting element.

Referring to FIG. 6, a driver circuit 90 is incorporated with two H-bridge circuits 96 (N-ch H bridge 1 in FIG. 6), 99 (N-ch H bridge 2 in FIG. 6) serving as two channels. As shown in FIG. 6, one channel is a circuit in which a switching element constituting an H-bridge is an N-channel MOS-FET circuit. Specifically, the H-bridge circuit 96 has its driving direction F/R controlled by high or low level of Xpwm which is inputted to the control terminal IN1 of the driver circuit 90, whereas the H-bridge circuit 99 has its driving direction F/R controlled by high or low level of Ypwm which is inputted to the control terminal IN2 of the driver circuit 90. F denotes forward direction, and R denotes reverse direction, respectively.

In this arrangement, the applied voltage is allowed to be turned to an OFF-state by setting the control terminal INC of the driver circuit 90 to L (low level). A control terminal PS of the driver circuit 90 is connected with a power-save control terminal of a microcomputer 101. The control terminal PS turns off the driver circuit 90 as timed with non-activation of shake correction.

The driver circuit 90 is further incorporated with a functional block (such as an oscillating circuit 91, a charge pump circuit 92, a level control circuit 94, and a level shift circuit 98) of raising the voltage of the control terminal in the N-channel MOS-FET of the H-bridge circuit 96 (99) so as to controllably turn on and off the MOS-FET, and a switching control functional block (such as a switching circuit 95 and a control circuit 97) of controlling on and off of the MOS-FET in response to an output signal from the control terminals IN1, IN2, INC. With this arrangement, even if the voltage outputted from the microcomputer 101 is low, and the number of terminals for inputting control signals is small, the applied voltage to the X-direction drive actuator 24 and the Y-direction drive actuator 22 can be optimally controlled.

The driver circuit 90 is incorporated with a band-gap reference circuit 93 to supply a reference voltage to the oscillating circuit 91, the charge pump circuit 92, the level control circuit 94, and the control circuit 97.

The voltages to be applied to the electric/mechanical converting element of the X-direction drive actuator 24 and to the electric/mechanical converting element of the Y-direction drive actuator 22 are respectively supplied from external devices as Vpx and Vpy in the following manner. Specifically, voltages (CVpx, Cvpy) which are separately supplied from DACA70, DACB80 (constituting a D/A converting section of the microcomputer 101) serving as a channel for X-direction driving and a channel for Y-direction driving are outputted to difference amplifiers 72 to 74, and 82 to 84 via buffer circuits 71, 81, respectively for level shifting and amplification ratio conversion. After the level shifting and the amplification ratio conversion in the difference amplifiers 72 to 74, and 82 to 84, the voltages (CVpx, Cvpy) are converted to applied voltages (Vpx, Vpy) of an optimal level, and supplied to the electrical/mechanical converting element of the X-direction drive actuator 24 and to the electrical/mechanical converting element of the Y-direction drive actuator 22, respectively.

A power supply voltage Vpi is supplied from a battery or a DC/DC converter as a constant value depending on the capacity (size) of the electrical/mechanical converting element used in the X-direction drive actuator 24 (Y-direction drive actuator 22). In case of driving a lens of a camera, the power supply voltage Vpi is preferably in the range from about 6V to about 8V. Denoted at reference numeral 75 (85) is a capacitor for accumulating electric charges to keep an applied voltage from being fluctuated greatly even if the corresponding electric/mechanical converting element is applied with a rectangular waveform voltage of a high frequency such as about 60 kHz. In this embodiment, the capacity of the capacitor 75 (85) is preferably about 1 µF considering the cycle (e.g. 1 kHz) of changing the applied voltage controlled by the microcomputer 101, the maximal voltage change, and the capacity of the electrical/mechanical converting element.

Referring to FIG. 8A, in the case where the applied voltage is fixed to Vpx, the actual voltage applied to the electrical/mechanical converting element is changed from Vpx to −Vpx because the driving direction of the H-bridge circuit 96 is changed from F/R to R/F and vice versa in response to switching of the control terminal 1N1 between high level (Vcc) and low level (ground level).

The section (a) in FIG. 8B shows a change of Vpx in a low time-resolution, wherein the voltage actually applied to the electrical/mechanical converting element is controlled by varying the applied voltage at a cycle of about 1 kHz (by updating the optimal applied voltage) in combination with direction inverting control of the H-bridge circuit 96 operated at a cycle of about 60 kHz. By this control, the average angular velocity of the electrical/mechanical converting element is controllable at a cycle of 1 kHz while allowing the electrical/mechanical converting element to constantly oscillate with an optimal resonance frequency (e.g. about 60 kHz). This control is cyclically repeated during driving of the shake correction optical system 26.

In this embodiment, the controlling circuit 19 is provided in the camera main body 2 to control the Y-direction drive actuator 22 and the X-direction drive actuator 24. Alternatively, the controlling circuit 19 may be provided in the taking lens 3. With such an altered arrangement, the camera main body 2 can be dispensed with the circuits for controlling the shake correction optical system 26 to thereby reduce the size and the production cost of the camera main body 2.

Figures 9A, 9B:
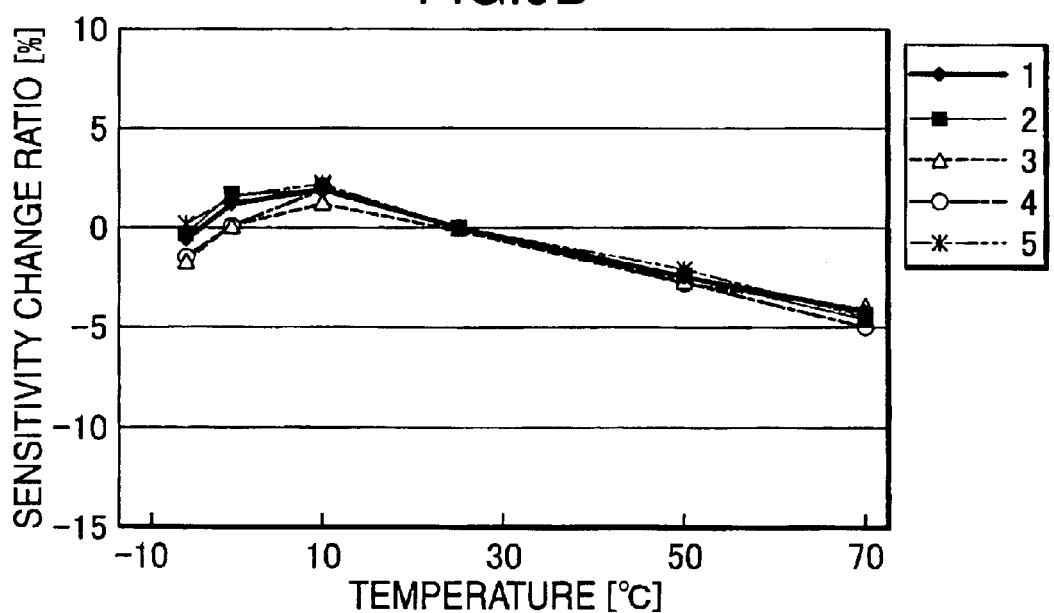
FIGS. 9A and 9B are diagrams explaining a temperature-dependent sensitivity variation of a gyro provided in the camera.
Figures 10A, 10B:
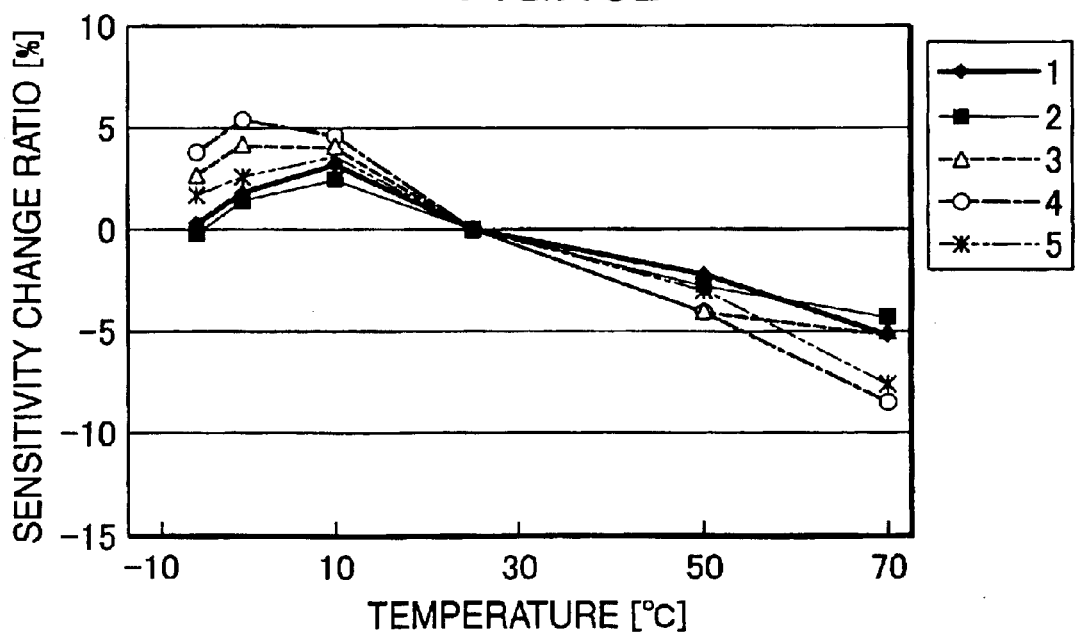
FIGS. 10A and 10B are diagrams explaining a temperature-dependent sensitivity variation of a gyro different from the gyro in FIGS. 9A and 9B in channel.
Figures 11A, 11B:
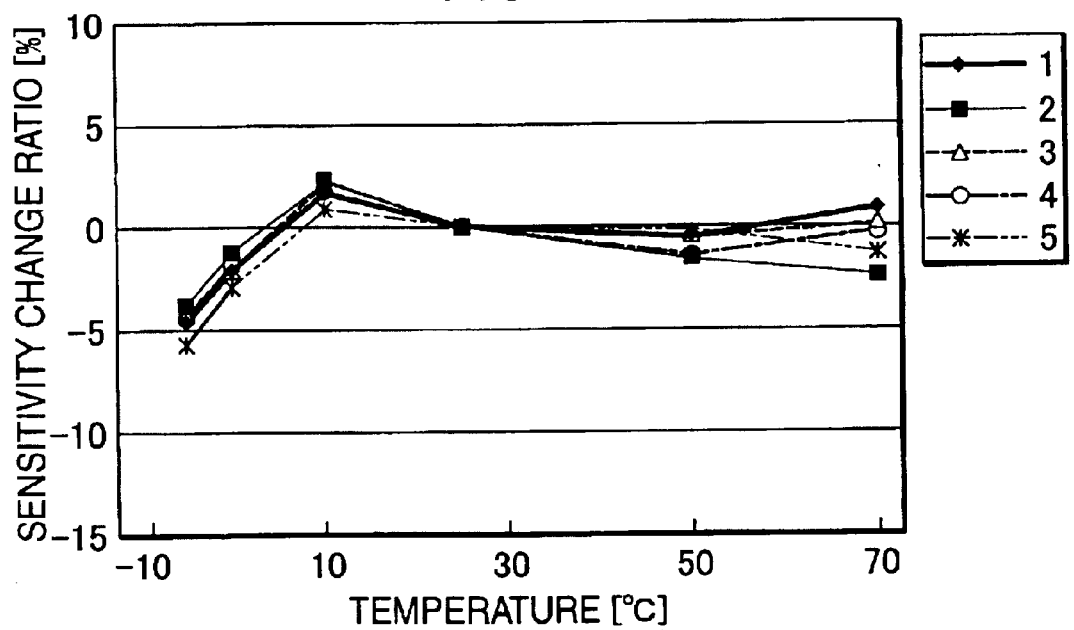
FIGS. 11A and 11B are diagrams explaining a temperature-dependent sensitivity variation of a gyro different from the gyro in FIGS. 9A and 9B in type.
Figures 12A, 12B:
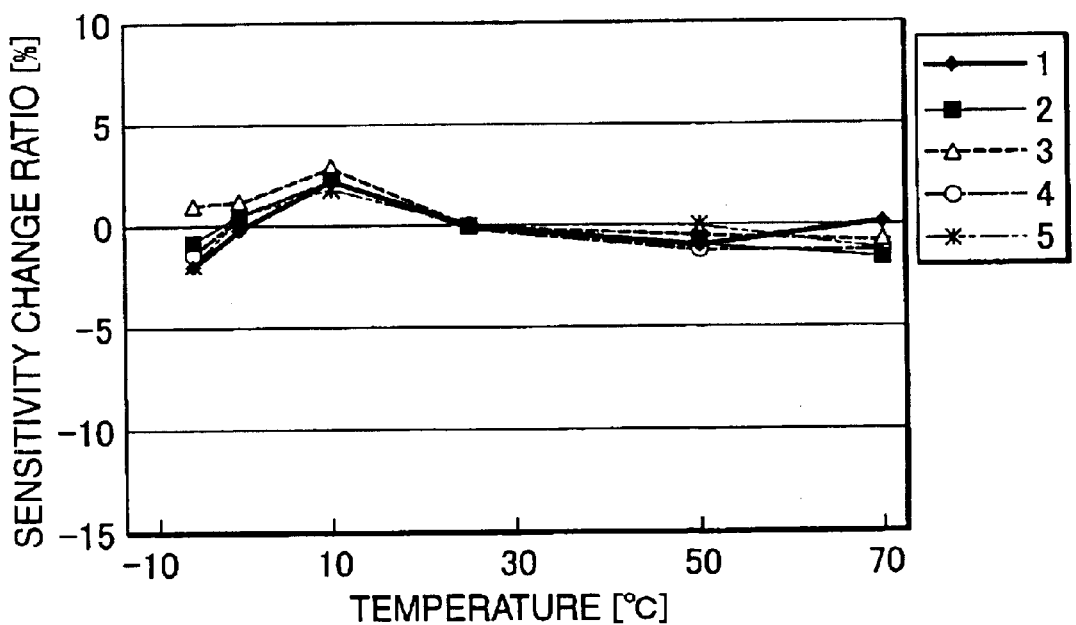
FIGS. 12A and 12B are diagrams explaining a temperature-dependent sensitivity variation of a gyro different from the gyro in FIGS. 9A and 9B in type and in channel.

FIGS. 9A through 12B illustrate temperature-dependent sensitivity variation of a gyro. FIG. 9A shows measurement results regarding sensitivity variation of a specific type of gyro (TYPE01_A) obtained by changing the inner temperature of the camera main body stepwise (5 steps). FIG. 9B shows the measurement results in FIG. 9A in terms of a relationship between temperature and sensitivity change ratio. FIGS. 10A and 10B illustrate temperature-dependent sensitivity variation of a gyro which is different from the gyro shown in FIGS. 9A and 9B in channel. Specifically, FIG. 10A shows measurement results regarding sensitivity variation of a specific type of gyro (TYPB01_B) obtained by changing the inner temperature of the camera main body stepwise (5 steps). FIG. 10B shows the measurement results in FIG. 10A in terms of a relationship between temperature and sensitivity change ratio. FIGS. 11A and 11B illustrate temperature-dependent sensitivity variation of a specific type of gyro (TYPE02_A) which is different from the gyros used in FIGS. 9A, 9B, and 10A, 10B in type. Specifically, FIG. 11A shows measurement results regarding sensitivity change ratios of the gyro (TYPE02_A) obtained by changing the inner temperature of the camera main body stepwise (5 steps). FIG. 11B shows the measurement results in FIG. 11A in terms of a relationship between temperature and sensitivity change ratio. FIGS. 12A and 12B illustrate temperature-dependent sensitivity variation of a gyro which is different from the gyros used in FIGS. 9A, 9B, and 10A, 10B in type and in channel. Specifically, FIG. 12A shows measurement results regarding sensitivity change ratios of a specific type of gyro (TYPE02_B) obtained by changing the inner temperature of the camera main body stepwise (5 steps). FIG. 12B shows the measurement results in FIG. 12A in terms of a relationship between temperature and sensitivity change ratio.

In FIGS. 9B, 10B, 11B, and 12B, the axis of abscissa denotes temperature (° C.), and the axis of ordinate denotes sensitivity change ratio (%). "TYPE01" in "TYPE01_A" denotes the type of gyro, and "A" denotes the number of channel. Specifically, "TYPE01_A" in FIGS. 9A and 9B and "TYPE01_B" in FIGS. 10A and 10B denote that the gyros are identical to each other in type and different from each other in channel (frequency). "TYPE01_A" and "TYPE02_A" in FIGS. 11A and 11B denote that the gyros are different from each other in type and identical to each other in channel.

Referring to FIG. 9A, the temperature is changed stepwise from −5° C. to 70° C. on the basis that the sensitivity change ratio at room temperature of 25° C. is 0%, and measured are the sensitivity change ratios of five gyros of TYPE01_A (indicated as LOT No. 1A1 through 1A5 in FIG. 9A) at −5° C., 0° C., 10° C., 50° C., and 70° C., respectively.

As shown in FIG. 9A, when the temperature was −5° C., the sensitivity change ratio of the first one of the gyros was −0.6%; the sensitivity change ratio of the second one of the gyros was −0.3%; the sensitivity change ratio of the third one of the gyros was −1.7%; the sensitivity change ratio of the fourth one of the gyros was −1.5%; and the sensitivity change ratio of the fifth (last) one of the gyros was 0.2%, respectively. When the temperature was −5° C., the average (AVE) of the sensitivity change ratios of the five gyros of TYPE01_A (indicated as LOT No. 1A1 to 1A5 in FIG. 9A) was −0.78%, the maximal sensitivity ratio (MAX) was 0.2%, the minimal sensitivity change ratio (MIN) was −1.7%, the value (MAX2) obtained by subtracting the average value from the maximal sensitivity change ratio was 0.98%, and the value (MIN2) obtained by subtracting the average value from the minimal sensitivity change ratio was −0.92%, respectively.

Further, as shown in FIG. 9A, when the temperature was 0° C., the average (AVE) of the sensitivity change ratios of the five gyros was 0.92%, the maximal sensitivity ratio (MAX) was 1.7%, the minimal sensitivity change ratio (MIN) was 0.1%, the value (MAX2) obtained by subtracting the average value from the maximal sensitivity change ratio was 0.78%, and the value (MIN2) obtained by subtracting the average value from the minimal sensitivity change ratio was −0.82%, respectively. When the temperature was 10° C., the average (AVE) of the sensitivity change ratios of the five gyros was 1.9%, the maximal sensitivity ratio (MAX) was 2.2%, the minimal sensitivity change ratio (MIN) was 1.3%, the value (MAX2) obtained by subtracting the average value from the maximal sensitivity change ratio was 0.3%, and the value (MIN2) obtained by subtracting the average value from the minimal sensitivity change ratio was −0.6%, respectively. When the temperature was 50° C., the average (AVE) of the sensitivity change ratios of the five gyros was −2.5%, the maximal sensitivity ratio (MAX) was −2.1%, the minimal sensitivity change ratio (MIN) was −2.8%, the value (MAX2) obtained by subtracting the average value from the maximal sensitivity change ratio was 0.4%, and the value (MIN2) obtained by subtracting the average value from the minimal sensitivity change ratio was −0.3%, respectively. When the temperature was 70° C., the average (AVE) of the sensitivity change ratios of the five gyros was −4.42%, the maximal sensitivity ratio (MAX) was −3.9%, the minimal sensitivity change ratio (MIN) was −5.0%, the value (MAX2) obtained by subtracting the average value from the maximal sensitivity change ratio was 0.52%, and the value (MIN2) obtained by subtracting the average value from the minimal sensitivity change ratio was −0.58%, respectively.

As shown in FIG. 9A, the sensitivity change ratios of the gyros of TYPE01_A range from −5.0% corresponding to a minimal change ratio to 2.2% corresponding to a maximal change ratio. This range of the sensitivity change ratio corresponds to a measurement error range in shake detection with respect to the gyros of TYPE01_A. Further, as shown in FIG. 10A, the sensitivity change ratios of the gyros of TYPE01_B range from −8.5% corresponding to a minimal change ratio to 5.4% corresponding to a maximal change ratio. This range of the sensitivity change ratio corresponds to a measurement error range in shake detection with respect to the gyros of TYPE01_B. Furthermore, as shown in FIG. 11A, the sensitivity change ratios of the gyros of TYPE02_A range from −5.7% corresponding to a minimal change ratio to 2.3% corresponding to a maximal change ratio. This range of the sensitivity change ratio corresponds to a measurement error range in shake detection with respect to the gyros of TYPE02_A. Also, as shown in FIG. 12A, the sensitivity change ratios of the gyros of TYPE02_B range from −2.0% corresponding to a minimal change ratio to 2.9% corresponding to a maximal change ratio. This range of the sensitivity change ratio corresponds to a measurement error range in shake detection with respect to the gyros of TYPE02_B.

As mentioned above, in the case of the camera 1, since the shutter release button 14 is so designed as to be depressed in Y1 direction in FIG. 1 at the time of photographing, a shake amount in pitch direction is generally larger than that in yaw direction. In view of this, in the camera 1, used is a gyro having a higher shake detection precision, namely, a gyro having a smaller temperature-dependent sensitivity change ratio as a gyro for detecting a shake in pitch direction (namely, pitch gyro unit 11).

Specifically, when a gyro of TYPE01 is used, since a gyro of TYPE01_A has a smaller detection error than a gyro of TYPE01_B, the gyro of TYPE01_A is used as the pitch gyro unit 11. Likewise, when a gyro of TYPE02 is used, since a gyro of TYPE02_B has a smaller detection error than a gyro of TYPE02_A, the gyro of TYPE02_B is used as the pitch gyro unit 11.

Further, the range of detection error with respect to gyros of TYPE01_A is 7.2%, the range of detection error with respect to gyros of TYPE01_B is 13.9%, the range of detection error with respect to gyros of TYPE02_A is 8%, and the range of detection error with respect to gyros of TYPE02_B is 4.9%. Accordingly, it is preferable to use the gyro of TYPE02_B having a least detection error among the above four types of gyros as the pitch gyro unit 11.

In this way, using a gyro having a smaller sensitivity change ratio as the pitch gyro unit 11 while using a gyro having a larger sensitivity change ratio as the yaw gyro unit 12 makes it possible to perform shake correction with high precision and at a low cost.

A gyro of TYPE01_A and a gyro of TYPE01_B are gyros identical to each other in type and different from each other in channel. Since it is necessary to detect an angular displacement or shake of a camera in two different directions (pitch direction and yaw direction) for shake correction, it is a general practice to use the gyros of TYPE01_A and TYPE01_B in pair. In using these gyros as a pair, however, there is likelihood that the gyros of TYPE01_A and TYPE01_B may resonate with each other. In view of such a likelihood, the driving frequency of the piezoelectric element in the pitch gyro unit 11 and the driving frequency of the piezoelectric element in the yaw gyro unit 12 are differentiated from each other. Whereas the driving frequency for driving the pitch gyro unit 11 is set to 22 kHz, the driving frequency for driving the yaw gyro unit 12 is set to 24 kHz, for example. The driving frequencies for driving the pitch gyro units 11 and 12 are differentiated from each other by differentiating the lengths of the piezoelectric elements used in the pitch gyro units 11 and 12 from each other.

In case that that oscillating gyros each having a piezoelectric element are used as the pitch gyro unit 11 and the yaw gyro unit 12 respectively, resonance of the two gyro units 11 and 12 can be avoided by differentiating the driving frequencies of the pitch gyro unit 11 and the yaw gyro unit from each other.

In the previous embodiment, shake correction with high precision and at a low cost is attained by using a gyro having higher detection precision as the pitch gyro unit for detecting an angular velocity of a shake of the camera in pitch direction. In the second embodiment, shake correction with higher precision is attained by performing temperature correction with respect to the sensitivity of the gyro.

Figure 13:
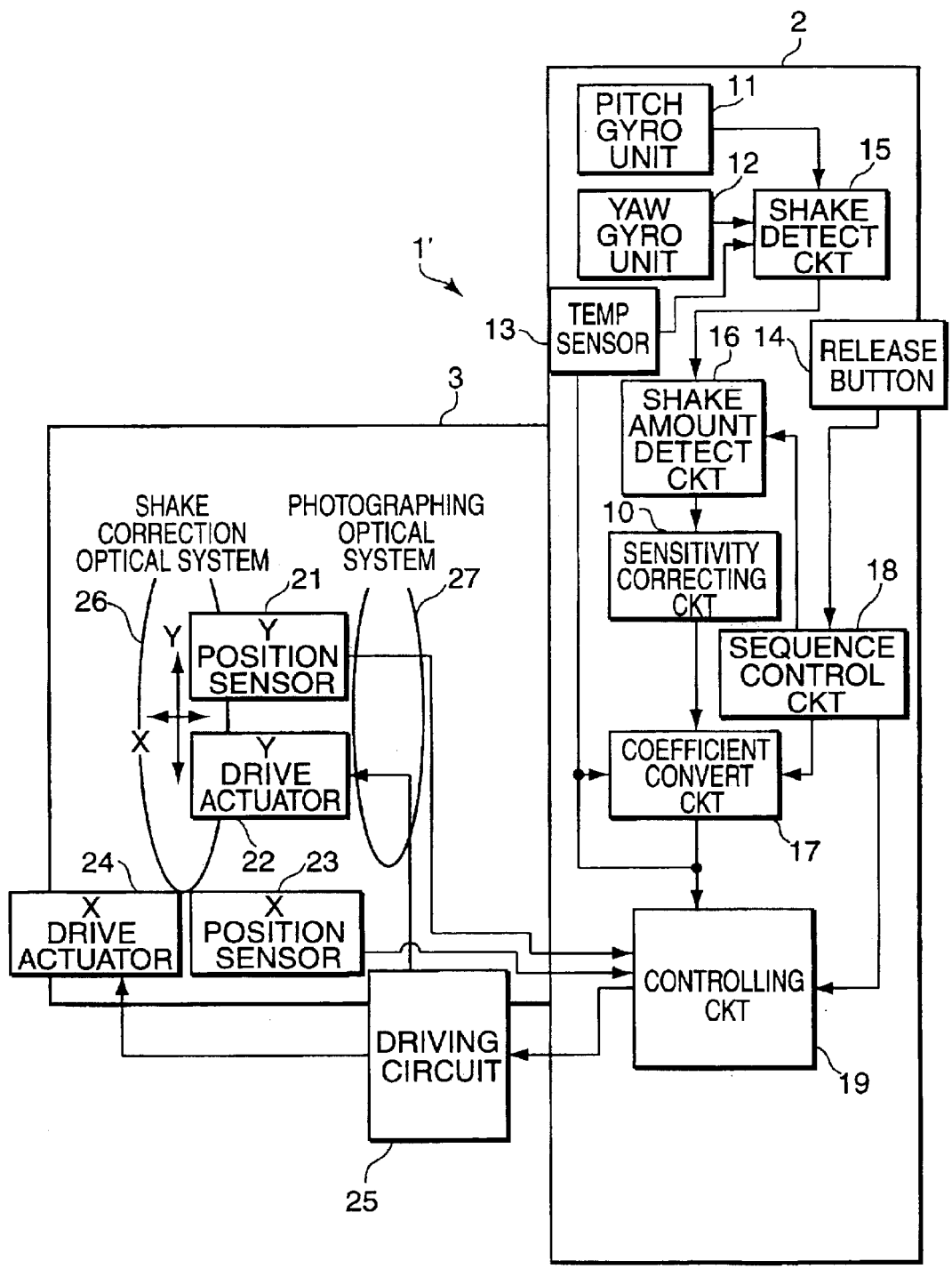
FIG. 13 is a block diagram schematically showing an arrangement of a camera having a shake correction function in accordance with another embodiment of the invention.

Referring to FIG. 13 showing an arrangement of a camera having a shake correction function in accordance with another embodiment of the invention, a camera 1' having a shake correction function includes a camera main body 2 and a taking lens 3. The camera main body 2 has a sensitivity correcting section 10, a pitch gyro unit 11, a yaw gyro unit 12, a temperature sensor 13, a shutter release button 14, a shake detecting circuit 15, a shake amount detecting circuit 16, a coefficient converting circuit 17, a sequence controlling circuit 18, and a controlling circuit 19. The taking lens 3 includes a Y-direction position sensor 21, a Y-direction drive actuator 22, an X-direction position sensor 23, an X-direction drive actuator 24, a driving circuit 25, a shake correction optical system 26, and a photographing optical system 27. The arrangement of the camera 1' shown in FIG. 13 is substantially identical to that of the camera 1 in the first embodiment shown in FIG. 2. Accordingly, merely the arrangement of the second embodiment different from that of the first embodiment is described in this section.

The shake amount detx in X-direction of the camera 1' and the shake amount dety in Y-direction of the camera 1' which are outputted from the shake amount detecting circuit 16 are inputted to the sensitivity correcting section 10. The sensitivity correcting section 10 performs temperature-dependent sensitivity correction with respect to the shake amount detx in X-direction of the camera 1' and the shake amount dety in Y-direction of the camera 1' based on data concerning the inner temperature of the camera main body 2 detected by the temperature sensor 13. Specifically, the sensitivity correcting section 10 determines a correction coefficient based on the temperature of the camera main body 2 detected by the temperature sensor 13 while referring to a lookup table in which the inner temperature of the camera main body 2 and the correction coefficient for performing temperature-dependent sensitivity correction of the gyro are stored in correlation to each other, and performs sensitivity correction with respect to the shake amounts (detx, dety) with use of the determined correction coefficient. The lookup table stores correction coefficients with respect to the sensitivity correction in correlation to the temperature therein. For instance, the lookup table stores correction coefficients every 5° C. in the temperature range from −5° C. to 70° C. After sensitivity is corrected by the sensitivity correcting section 10, the shake amounts (detx, dety) in X- and Y-directions are inputted to the coefficient converting circuit 17.

The temperature sensor 13 is, for example, a thermistor, and detects the ambient temperature inside the camera 1' and outputs the detection result to the sensitivity correcting section 10, the coefficient converting circuit 17, and the controlling circuit 19 of the camera main body 2, respectively. The detection result is utilized to correct a variation in the output signal due to a variation in various characteristics of various parts of the camera depending on a change in temperature. Correction of such a variation includes correction of a temperature-dependent sensitivity variation of the pitch gyro unit 11 and the yaw gyro unit 12, correction of a temperature-dependent variation of the shake correction optical system 26, the Y-position sensor 21, and the X-direction position sensor 23, and correction of basic driving frequencies and drive voltages of the Y-direction drive actuator 22 and the X-direction drive actuator 24. These detection results are stored in the memory (not shown) of the camera main body 2 in the format of a lookup table in which correction values in correlation to the temperatures are stored with respect to each characteristic.

The temperature sensor 13 is preferably provided in vicinity of the pitch gyro unit 11 and the yaw gyro unit 12 in order to perform temperature-dependent sensitivity correction of the pitch gyro unit 11 and the yaw gyro unit 12. Alternatively, a temperature sensor may be provided in the taking lens 3 to perform temperature-dependent variation correction of the shake correction optical system 26, the X-direction sensor 23, and the Y-direction sensor 21, as well as a correction with respect to basic driving frequencies and drive voltages of the X-direction drive actuator 24, and the Y-direction drive actuator 22. Further alternatively, the temperature sensor 13 for detecting the temperature of the pitch gyro unit 11 and the yaw gyro unit 12 may be omitted in the following condition. Specifically, in the case that a member for detecting the temperature of a CCD sensor or the like is provided in the camera, it is possible to use such a detecting member as a temperature sensor for detecting the temperature of the pitch gyro unit 11 and the yaw gyro unit 12.

The temperature characteristic of the gyro representing the measurement results regarding the temperature-dependent sensitivity variation shown in FIG. 9A is shown in FIG. 9B. Likewise, the temperature characteristics of the gyro representing the measurement results regarding the temperature-dependent sensitivity variation shown in FIG. 10A (FIG. 11A, and FIG. 12A) are shown in FIG. 10B (FIG. 11B, and FIG. 12B). Similar to FIG. 9B, the temperature characteristic of the gyro in FIG. 10B (FIG. 11B, and FIG. 12B) is such that the higher the temperature, the lower the sensitivity change ratio is on the basis of the room temperature of 25° C. In the conventional arrangement, it is difficult to completely eliminate a temperature-dependent sensitivity variation of the gyro although some structural arrangement or adjustment is made inside the gyro in an attempt to secure stable sensitivity regardless of a change in temperature.

Observation on the value (MAX2) obtained by subtracting the average value from the maximal sensitivity change ratio and the value (MIN2) obtained by subtracting the average value from the minimal sensitivity change ratio reveals that the temperature-dependent sensitivity variation is suppressed as less as in the range from −0.92 to 0.98%. Therefore, it is possible to suppress a temperature-dependent sensitivity variation of the gyro by correcting the angular velocity signal in pitch direction (shake amount in X-direction) and the angular velocity signal in yaw direction (shake amount in Y-direction) to allow the sensitivity change ratio to fall in the above range for attaining further detection precision. Specifically, prepared are lookup tables in which the correction coefficients are stored in correlation to temperatures in such a manner that a value obtained by subtracting the average value of the sensitivity change ratios which has been measured in advance, from the sensitivity change ratio corresponding to an output signal from the pitch gyro unit 11 (yaw gyro unit 12) is used as an effective sensitivity change ratio, and the lookup tables are stored in a memory inside the camera main body. The sensitivity correcting section 10 determines the correction coefficient based on the temperature data outputted from the temperature sensor 13 while referring to the corresponding lookup table, and multiplies the output signal from the pitch gyro unit 11 (yaw gyro unit 12) by the determined correction coefficient to perform sensitivity correction.

Referring to FIG. 14 showing a difference in temperature-dependent sensitivity variation of the gyro resulting from a difference in type and channel of the gyro, in the case that a temperature correction regarding the sensitivity of the gyro of TYPE01_A is not executed, a maximal detection error (MAX) with respect to the gyro is 2.2%, whereas the minimal detection error (MIN) is −5.0%. Namely, a difference between the maximal detection error and the minimal detection error with respect to the gyro of TYPE01_A is 7.2%. Further, in the case that a temperature correction regarding the sensitivity of the gyro of TYPE01_B is not executed, a maximal detection error (MAX) with respect to the gyro is 5.4%, whereas the minimal detection error (MIN) is −8.5%. Namely, a difference between the maximal detection error and the minimal detection error with respect to the gyro of TYPE01_B is 13.9%. Further, in the case that a temperature correction regarding the sensitivity of the gyro of TYPE02_A is not executed, a maximal detection error (MAX) with respect to the gyro is 2.3%, whereas the minimal detection error (MIN) is −5.7%. Namely, a difference between the maximal detection error and the minimal detection error with respect to the gyro of TYPE02_A is 8.0%. Further, in the case that a temperature correction regarding the sensitivity of the gyro of TYPE02_B is not executed, a maximal detection error (MAX) with respect to the gyro is 2.9%, whereas the minimal detection error (MIN) is −2.0%. Namely, a difference between the maximal detection error and the minimal detection error with respect to the gyro of TYPE02_B is 4.9%.

In the case of executing shake correction with use of the gyro of TYPE01 in an attempt to attain such a detection precision as detection error of 10% or less, a temperature correction regarding the sensitivity of the gyro is required as exemplified in this embodiment. On the other hand, in the case of executing shake correction with use of the gyro of TYPE02, temperature correction regarding the sensitivity of the gyros of TYPE02_A and TYPE02_B is not required as far as detection error of 10% or less is demanded. This is because both of the detection errors with respect to the gyros of TYPE02_A and TYPE02_B do not exceed 10%. Specifically, as far as the gyro satisfies a certain level of detection precision, it is not necessarily required to perform temperature correction regarding the sensitivity of the gyro. A temperature correction regarding the sensitivity of the gyro may be performed exclusively in achieving detection of high precision (e.g. detection error within 5% or less).

On the other hand, in the case that a temperature correction is executed with respect to the sensitivity of the gyro of TYPE01_A, a maximal detection error (MAX) with respect to the gyro is 0.98%, whereas the minimal detection error (MIN) is −0.92%. Namely, a difference between the maximal detection error and the minimal detection error with respect to the gyro of TYPE01_A is 1.9%. Further, in the case that a temperature correction is executed with respect to the sensitivity of the gyro of TYPE01_B, a maximal detection error (MAX) with respect to the gyro is 2.14%, whereas the minimal detection error (MIN) is −2.38%. Namely, a difference between the maximal detection error and the minimal detection error with respect to the gyro of TYPE01_B is 4.52%. Further, in the case that a temperature correction is executed with respect to the sensitivity of the gyro of TYPE02_A, a maximal detection error (MAX) with respect to the gyro is 1.48%, whereas the minimal detection error (MIN) is −1.82%. Namely, a difference between the maximal detection error and the minimal detection error with respect to the gyro of TYPE02_A is 3.3%. Further, in the case that a temperature correction regarding the sensitivity of the gyro of TYPE02_B is executed, a maximal detection error (MAX) with respect to the gyro is 0.96%, whereas the minimal detection error (MIN) is 0.74%. Namely, a difference between the maximal detection error and the minimal detection error with respect to the gyro of TYPE02_B is 1.7%.

As is obvious from FIG. 14, in the case that a temperature correction regarding the sensitivity of the gyro is executed, the difference between the maximal detection error and the minimal detection error with respect to the gyro of TYPE01_A is 1.9%, and the difference between the maximal detection error and the minimal detection error with respect to the gyro of TYPE01_B is 4.52%. As compared with the case that a temperature correction is not executed, the detection error can be decreased by about 5 to 9%, thereby raising detection precision. Likewise, the difference between the maximal detection error and the minimal detection error with respect to the gyro of TYPE02_A is 3.3%, and the difference between the maximal detection error and the minimal detection error with respect to the gyro of TYPE02_B is 1.7%. As compared with the case that a temperature correction is not executed, the detection error can be decreased by about 3 to 5%, thereby raising detection precision.

The image sensing apparatus in accordance with the second embodiment makes it possible to perform shake correction with high precision and at a low cost without additionally providing an arrangement of correcting a detection error due to a temperature change and without providing a complicated circuit configuration, which have been required in the conventional image sensing apparatus.

In this embodiment, shake correction is performed by driving the shake correction optical system 26. The invention is not limited thereto. As an altered form, shake correction may be carried out by driving an image sensor (CCD sensor) of sensing an object image, or by processing image data picked up by the image sensor.

In the second embodiment, a temperature-dependent sensitivity variation of the pitch gyro unit 11 and the yaw gyro unit 12 is corrected. The invention is not limited thereto. Alternatively, solely a temperature-dependent sensitivity variation of the pitch gyro unit 11 may be corrected. Specifically, since a shake in pitch direction is generally larger than a shake in yaw direction, a sufficient detection precision can be secured by correcting solely a temperature-dependent sensitivity variation of the pitch gyro unit 11 for detecting a shake of a camera in pitch direction. In such an altered case, it is possible to provide a temperature sensor 13 in vicinity of the pitch gyro unit 11, in place of providing the temperature sensor 13 in vicinity of the pitch gyro unit 11 and the yaw gyro unit 12, and the sensitivity correcting section 10 may correct merely a temperature-dependent sensitivity variation of the pitch gyro unit 11. With such an altered arrangement, since merely the sensitivity of the output signal from the pitch gyro unit 11 is corrected based on the temperature data outputted from the temperature sensor, the circuit arrangement can be simplified as well as the signal processing, as compared with the case of correcting the sensitivities of the output signals outputted from the pitch gyro unit 11 and the yaw gyro unit 12.

As mentioned above, the temperature sensor 13 detects the temperatures of the pitch gyro unit 11 and the yaw gyro unit 12 as temperature data. The sensitivity correcting section 10 corrects the sensitivities of the output signals outputted from the pitch gyro unit 11 and the yaw gyro unit 12 based on the temperature data outputted by the temperature sensor 13.

Thus, correction can be performed in compliance with temperature-dependent sensitivity variations of the pitch gyro unit 11 and the yaw gyro unit 12 in response to the output signals from the pitch gyro unit 11 and the yaw gyro unit 12. This arrangement makes it possible to perform shake correction with high precision and at a low cost.

Further, the correction coefficient is determined by referring to the corresponding lookup table storing correction coefficients to cancel a variation in sensitivity in correlation to the temperature data, and the variation of the output signal outputted from at least one of the pitch gyro unit 11 and the yaw gyro unit 12 is corrected based on the determined correction coefficient. With this arrangement, a temperature-dependent sensitivity variation can be corrected easily by detecting the temperatures of the pitch gyro unit 11 and the yaw gyro unit 12, and a shake correction can be performed with high precision and at a low cost.

As described above, the horizontal-direction shake detecting sensor detects a shake of the image sensing apparatus in yaw direction, and the vertical-direction shake detecting sensor detects a shake of the image sensing apparatus in pitch direction. The shake of the image sensing apparatus is corrected based on an output signal from the horizontal-direction shake detecting sensor and an output signal from the vertical-direction shake detecting sensor. The sensor having a higher precision in shake detection is used as the vertical-direction shake detecting sensor.

In the image sensing apparatus constructed such that a shake amount of the apparatus in pitch direction is large than that in yaw direction, the sensor having a higher precision in shake detection is used as the vertical-direction shake detecting sensor. This arrangement can eliminate an additional arrangement for correcting a measurement error due to a temperature change, which has been required in the conventional arrangement, and can perform shake correction with high precision and at a low cost without making a circuit configuration complicated, which has been necessary in the conventional arrangement.

The horizontal-direction shake detecting sensor detects a shake of the apparatus in yaw direction, and the vertical-direction shake detecting sensor detects a shake of the apparatus in pitch direction. The shake of the image sensing apparatus is corrected based on an output signal from the horizontal-direction shake detecting sensor and an output signal from the vertical-direction shake detecting sensor. The sensor having a smaller temperature-dependent sensitivity variation is used as the vertical-direction shake detecting sensor.

In the image sensing apparatus constructed such that a shake amount of the apparatus in pitch direction is large than that in yaw direction, the sensor having a smaller temperature-dependent sensitivity variation is used as the vertical-direction shake detecting sensor. This arrangement can eliminate an additional arrangement for correcting a measurement error due to a temperature change, which has been required in the conventional arrangement, and can perform shake correction with high precision and at a low cost without making a circuit configuration complicated, which has been necessary in the conventional arrangement.

Since the driving frequencies of the horizontal-direction shake detecting sensor and the vertical-direction shake detecting sensor are differentiated from each other. Accordingly, in the case that oscillating gyros each having a piezoelectric element are used as the horizontal-direction shake detecting sensor and the vertical-direction shake detecting sensor respectively, resonance due to the two sensors can be prevented.

The temperature sensor detects the temperature of at least one of the horizontal-direction detecting sensor and the vertical-direction detecting sensor, and the output signal correcting section corrects the output signal from at least one of the horizontal-direction shake detecting sensor and the vertical-direction shake detecting sensor based on the detection result (temperature data) from the temperature sensor.

In the above arrangement, performed is correction to compensate for the variation in the output signal from at least one of the horizontal-direction shake detecting sensor and the vertical-direction shake detecting sensor. This arrangement makes it possible to perform shake correction with high precision and at a low cost.

Further, the correction coefficient is determined by referring to the lookup table storing the correction coefficients to correct the output signal variation due to the sensitivity variation in correlation to the temperature data, and the variation in the output signal from at least one of the horizontal-direction shake detecting sensor and the vertical-direction shake detecting sensor is corrected based on the determined correction coefficient. With this arrangement, the output signal variation due to the variation in the sensitivity can be easily corrected by detecting the temperature of at least one of the horizontal-direction shake detecting sensor and the vertical-direction shake detecting sensor to thereby perform shake correction with high precision and at a low cost.

As the invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image sensing apparatus comprising:
    a first shake detecting section having a first shake sensor which detects a shake of the image sensing apparatus in a first direction, the first shake sensor having a first detection characteristic;
    a second shake detecting section having a second shake sensor which detects a shake of the image sensing apparatus in a second direction, the second shake sensor having a second detection characteristic different from the first detection characteristic; and
    a shake correcting section which corrects a shake of the image sensing apparatus based on outputs from the first shake detecting section and the second shake detecting section.

2. The image sensing apparatus according to claim 1, wherein the first direction is a yaw direction of the image sensing apparatus, and the second direction is a pitch direction of the image sensing apparatus.

3. The image sensing apparatus according to claim 2, wherein the first and second detection characteristics are in connection with a precision in shake detection.

4. The image sensing apparatus according to claim 3, wherein the shake detection precision of the second shake sensor is higher than the shake detection precision of the first shake sensor.

5. The image sensing apparatus according to claim 4, wherein the shake detection precision of the second shake sensor is less influenced by temperature than the shake detection precision of the first shake sensor.

6. The image sensing apparatus according to claim 1, wherein the first and second detection characteristics are in connection with a driving frequency of the shake sensor.

7. An image sensing apparatus comprising:
a yaw sensor which detects a shake of the image sensing apparatus in a yaw direction;
a pitch sensor which detects a shake of the image sensing apparatus in a pitch direction, the pitch sensor having a detection precision higher than the yaw sensor; and
a shake correcting section which corrects a shake of the image sensing apparatus based on an output signal from the yaw sensor and an output signal from the pitch sensor.

8. The image sensing apparatus according to claim 7, wherein the pitch sensor has a smaller temperature-dependent sensitivity variation than the yaw sensor.

9. The image sensing apparatus according to claim 7, wherein the yaw sensor and the pitch sensor have driving frequencies different from each other.

10. The image sensing apparatus according to claim 7, further comprising:
a temperature sensor which detects a temperature of at least one of the yaw sensor and the pitch sensor; and
an output signal correcting section which corrects the output signal from at least one of the pitch sensor and the yaw sensor based on the detection result from the temperature sensor to thereby cancel the output signal variation due to the sensitivity variation caused by a change in the temperature.

11. The image sensing apparatus according to claim 10, further comprising:
a lookup table which stores correction coefficients in correlation to detection results outputted from the temperature sensor,
wherein the output signal correcting section selects a suitable correction coefficient from the correction coefficients in the lookup table based on a detection result from the temperature sensor, and corrects the output signal from at least one of the yaw sensor and the pitch sensor based on the selected correction coefficient.

12. The image sensing apparatus according to claim 7, further comprising:
a temperature sensor which detects a temperature of the pitch sensor; and
an output signal correcting section which corrects the output signal from the pitch sensor based on a detection result from the temperature sensor to thereby cancel the output signal variation due to the sensitivity variation caused by a change in the temperature.

13. The image sensing apparatus according to claim 12, further comprising a lookup table which stores correction coefficients in correlation to detection results outputted from the temperature sensor, wherein the output signal correcting section selects a suitable correction coefficient from the correction coefficients in the lookup table based on a detection result from the temperature sensor, and corrects the output signal from the pitch sensor based on the selected correction coefficient.

* * * * *